US010745548B2

(12) United States Patent
Kniesel et al.

(10) Patent No.: US 10,745,548 B2
(45) Date of Patent: Aug. 18, 2020

(54) POLYPROPYLENE COMPOSITION WITH EXCELLENT PAINT ADHESION

(71) Applicant: BOREALIS AG, Vienna (AT)

(72) Inventors: Claudia Kniesel, Linz (AT); Pavel Shutov, Linz (AT); Susanne Kahlen, Linz (AT); Daniela Mileva, Pichling (AT); Floran Prades, Linz (AT)

(73) Assignee: BOREALIS AG (AT)

( * ) Notice: Subject to any disclaimer, the term of this patent is extended or adjusted under 35 U.S.C. 154(b) by 0 days.

(21) Appl. No.: 16/464,973

(22) PCT Filed: Dec. 14, 2017

(86) PCT No.: PCT/EP2017/082743
§ 371 (c)(1),
(2) Date: May 29, 2019

(87) PCT Pub. No.: WO2018/109056
PCT Pub. Date: Jun. 21, 2018

(65) Prior Publication Data
US 2019/0315956 A1 Oct. 17, 2019

(30) Foreign Application Priority Data

Dec. 15, 2016 (EP) ..................... 16204510

(51) Int. Cl.
*C08L 23/12* (2006.01)
*C08L 23/16* (2006.01)
*C08F 2/00* (2006.01)

(52) U.S. Cl.
CPC .............. *C08L 23/16* (2013.01); *C08F 2/001* (2013.01); *C08L 23/12* (2013.01); *C08L 2205/025* (2013.01); *C08L 2205/035* (2013.01); *C08L 2205/12* (2013.01); *C08L 2207/02* (2013.01)

(58) Field of Classification Search
CPC .... C08L 23/12; C08L 23/16; C08L 2205/025; C08L 2205/12; C08L 2205/035; C08L 2207/02; C08F 2/001
See application file for complete search history.

(56) References Cited

U.S. PATENT DOCUMENTS

| | | | | |
|---|---|---|---|---|
| 6,294,606 B1 * | 9/2001 | Chen | ..................... | G03G 9/0806 430/137.14 |
| 7,767,735 B2 * | 8/2010 | Koganehira | ........... | C09D 11/40 106/31.43 |
| 2001/0025093 A1 * | 9/2001 | Ishizaki | ..................... | C08J 3/12 526/210 |
| 2002/0035209 A1 | 3/2002 | Kanzaki et al. | | |
| 2008/0207821 A1 * | 8/2008 | Weber | ..................... | C08L 25/04 524/517 |
| 2009/0242847 A1 * | 10/2009 | Hosoya | .................. | G02F 1/167 252/500 |
| 2016/0137831 A1 | 5/2016 | Hosoi et al. | | |

FOREIGN PATENT DOCUMENTS

| | | |
|---|---|---|
| EP | 491566 A1 | 9/1992 |
| EP | 586390 B1 | 5/1997 |
| EP | 591224 B1 | 11/1998 |
| EP | 0887379 A1 | 12/1998 |
| EP | 1028984 B1 | 7/2001 |
| EP | 1183307 B1 | 7/2005 |
| EP | 2000506 A1 | 12/2008 |

(Continued)

OTHER PUBLICATIONS

Author Unknown, ISO 1133, the examiner notes International Standard ISO 1133-1, "Plastics-Determination of the Melt Mass-Flow Rate (MFR) and Melt Volume-Flow Rate (MVR) of Thermoplastics—Part 1: Standard Method", First Edition, Dec. 1, 2011, pp. 1-24.*
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, 1128-1134.
Cheng, "I3C NMR Analysis of Ethylene-Propylene Rubbers", Macromolecules 1984, 17, 1950-1955.
Zweifel et al., "Plastics Additives Handbook", 6th Edition, Department of Materials, Institute of Polymers, 2008.
Invitation to pay additional fees and partial ISR for application No. PCT/EP2017/082743, dated Apr. 4, 2018.
Partial European Search for Application No. 16204510.8-1302, dated May 11, 2017.

(Continued)

*Primary Examiner* — Patrick D Niland
(74) *Attorney, Agent, or Firm* — Tarolli, Sundheim, Covell & Tummino LLP

(57) ABSTRACT

The invention relates to a polypropylene composition (C) comprising: (i) 62 to 85 wt.-%, based on the total weight of the polypropylene composition (C), of a heterophasic propylene copolymer (HECO1) with a melt flow rate $MFR_2$ (230° C.) measured according to ISO 1133 in the range of 6.0 to 50.0 g/10 min; (ii) 10 to 30 wt.-%, based on the total weight of the polypropylene composition (C), of a heterophasic propylene copolymer (HECO2) with a melt flow rate $MFR_2$ (230° C.) measured according to ISO 1133 in the range of 0.1 to 5.5 g/10 min; (iii) 5 to 30 wt.-%, based on the total weight of the polypropylene composition (C), of an inorganic filler (F); wherein (a) the xylene cold soluble (XCS) fraction of the heterophasic propylene copolymer (HECO1) has a lower amount [in mol %] of $C_2$ and/or $C_4$ to $C_{12}$ α-olefin derived comonomer units than the xylene cold soluble (XCS) fraction of the heterophasic propylene copolymer (HECO2); (b) the xylene cold soluble (XCS) fraction of the heterophasic propylene copolymer (HECO1) has a lower the intrinsic viscosity (IV) than the xylene cold soluble (XCS) fraction of the heterophasic propylene copolymer (HECO2); and (c) the xylene cold soluble (XCS) fraction of the heterophasic propylene copolymer (HECO2) has an intrinsic viscosity (IV) in the range of 6.0 to 15.0 dl/g.

11 Claims, No Drawings

(56) References Cited

FOREIGN PATENT DOCUMENTS

| | | | |
|---|---|---|---|
| EP | 2154194 | A1 | 2/2010 |
| EP | 2610271 | A1 | 7/2013 |
| EP | 2610272 | A1 | 7/2013 |
| EP | 2610273 | A1 | 7/2013 |
| EP | 2891667 | A1 | 7/2015 |
| RU | 2464288 | A1 | 7/2015 |
| WO | 92/12182 | A1 | 7/1992 |
| WO | 99/24478 | A1 | 5/1999 |
| WO | 99/24479 | A1 | 5/1999 |
| WO | 00/68315 | A1 | 11/2000 |
| WO | 2004/111095 | A1 | 12/2004 |
| WO | 2012/007430 | A1 | 1/2012 |
| WO | 2014/023603 | A1 | 2/2014 |
| WO | 2015/024887 | A1 | 2/2015 |
| WO | 2004/000899 | A1 | 1/2016 |

OTHER PUBLICATIONS

Zweifel, et al., "Plastics Additives Handbook", 5th Edition, Department of Materials, Institute of Polymers, 2001.

Resconi, et al., "Selectivity in Propene Polymerization with Metallocene Catalysts", Chem. Rev. 2000, pp. 1253-1345.

Singh et al., "Triad sequence determination of ethylene-propylene copolymers—application of quantitative 13C NMR", Polymer Testing 28 (2009) pp. 475-479.

Wang et al., "Structural Analysis of Ethylene/Propylene Copolymers Synthesized with a Constrained Geometry Catalyst", Macromolecules 2000, 33, pgs. 1157-1162.

Zhou et al., "A new decoupling method for accurate quantification of polyethylene copolymer composition and triad sequence distribution with 13C NMR", Journal of Magnetic Resonance 187, (2007), pp. 225-233.

Russian Office action for Patent Application No. 2019120166/04, dated Dec. 6, 2019.

* cited by examiner

POLYPROPYLENE COMPOSITION WITH EXCELLENT PAINT ADHESION

The present invention is directed to a polypropylene composition (C), an article comprising the polypropylene composition (C) as well as the use of the polypropylene composition (C) to enhance paint adhesion of a molded article.

In the field of automotive applications, polyolefins such as polypropylenes are the material of choice as they can be tailored to specific purposes needed. For instance, heterophasic polypropylenes are widely used in the automobile industry, for instance in bumper applications, as they combine good stiffness with reasonable impact strength.

However, the surface of molded articles obtained from heterophasic polypropylene composition is rather smooth having a low polarity resulting in unfavourable prerequisites for interactions with a coating material. Thus, for demanding applications like automotive parts a pre-treatment as well as the application of an adhesion promoting layer (primer) is typically required to ensure proper paint adhesion. However, due to environmental and economic reasons it is desired to reduce the use of primers to a minimum, preferably to avoid the use of primers at all.

Thus, the object of the present invention is to provide a material which enables a skilled person to produce molded articles having a good stiffness, good impact balance and high paint adhesion, without the necessity to apply adhesion promoters such as primers.

The finding of the present invention is to provide a polypropylene composition (C) comprising a first heterophasic propylene copolymer (HECO1), a second heterophasic propylene copolymer (HECO2) and an inorganic filler (F), wherein the second heterophasic propylene copolymer (HECO2) has a high molecular weight dispersed phase with a high comonomer content.

A first aspect is directed at a polypropylene composition (C) comprising:
(i) 62 to 85 wt.-%, based on the total weight of the polypropylene composition (C), of a heterophasic propylene copolymer (HECO1) with a melt flow rate $MFR_2$ (230° C.) measured according to ISO 1133 in the range of 6.0 to 50.0 g/10 min;
(ii) 10 to 30 wt.-%, based on the total weight of the polypropylene composition (C), of a heterophasic propylene copolymer (HECO2) with a melt flow rate $MFR_2$ (230° C.) measured according to ISO 1133 in the range of 0.1 to 6.0 g/10 min;
(iii) 5 to 30 wt.-%, based on the total weight of the polypropylene composition (C), of an inorganic filler (F); wherein
(a) the xylene cold soluble (XCS) fraction of the heterophasic propylene copolymer (HECO1) has a lower amount [in mol %] of $C_2$ and/or $C_4$ to $C_{12}$ α-olefin derived comonomer units than the xylene cold soluble (XCS) fraction of the heterophasic propylene copolymer (HECO2);
(b) the xylene cold soluble (XCS) fraction of the heterophasic propylene copolymer (HECO1) has a lower intrinsic viscosity (IV) than the intrinsic viscosity (IV) of the xylene cold soluble (XCS) fraction of the heterophasic propylene copolymer (HECO2); and
(c) the xylene cold soluble (XCS) fraction of the heterophasic propylene copolymer (HECO2) has an intrinsic viscosity (IV) in the range of 6.0 to 15.0 dl/g.

It is appreciated that the polypropylene composition (C) fulfils in-equation (I):

$$C_x(XCS)[HECO2]/C_x(XCS)[HECO1] > 1.0 \qquad (I)$$

wherein
$C_x$ (XCS) [HECO2] is the amount [in mol %] of $C_2$ and/or $C_4$ to $C_{12}$ α-olefin derived comonomer units in the xylene cold soluble (XCS) fraction of the heterophasic propylene copolymer (HECO2)
$C_x$ (XCS) [HECO1] is the amount [in mol %] of $C_2$ and/or $C_4$ to $C_{12}$ α-olefin derived comonomer units in the xylene cold soluble (XCS) fraction of the heterophasic propylene copolymer (HECO1).

Furthermore, it is appreciated that the polypropylene composition (C) fulfils in-equation (II):

$$IV(XCS)[HECO2]/IV(XCS)[HECO1] > 1.0 \qquad (II)$$

wherein
IV (XCS) [HECO2] is the intrinsic viscosity (IV) of the xylene cold soluble (XCS) fraction of the heterophasic propylene copolymer (HECO2)
IV (XCS) [HECO1] is the intrinsic viscosity (IV) of the xylene cold soluble (XCS) fraction of the heterophasic propylene copolymer (HECO1).

Furthermore, it is appreciated that the xylene cold soluble (XCS) fraction of the heterophasic propylene copolymer (HECO1) comprises comonomer units derived from $C_2$ and/or $C_4$ to $C_{12}$ α-olefin in an amount of 35 to 60 mol % and/or that the xylene cold soluble (XCS) fraction of the heterophasic propylene copolymer (HECO2) comprises comonomer units derived from $C_2$ and/or $C_4$ to $C_{12}$ α-olefin in an amount in the range of 62 to 85 mol %.

Furthermore, it is appreciated that the xylene cold soluble (XCS) fraction of the heterophasic propylene copolymer (HECO1) has an intrinsic viscosity (IV) in the range of 0.8 to 5.5 dl/g.

Furthermore, it is appreciated that the heterophasic propylene copolymer (HECO1) comprises a (semi)crystalline polypropylene matrix (PM1) and an elastomeric propylene copolymer rubber (EPR1) dispersed in said (semi)crystalline polypropylene matrix (PM1) and that the heterophasic propylene copolymer (HECO2) comprises a (semi)crystalline polypropylene matrix (PM2) and an elastomeric propylene copolymer rubber (EPR2) dispersed in said (semi)crystalline polypropylene matrix (PM2).

Furthermore, it is appreciated that the heterophasic propylene copolymer (HECO1) and the heterophasic propylene copolymer (HECO2) are not modified by treatment with a peroxide (PO).

Furthermore, it is appreciated that the inorganic filler (F) is a mineral filler, preferably a mineral filler selected from the group consisting of talc, wollastonite, caolin and mica. In a preferred embodiment the inorganic filler (F) is talc with an average particle size ($D_{50}$) in the range of 0.5 to 20.0 μm.

A second aspect is directed at a heterophasic propylene copolymer (HECO2), wherein the xylene cold soluble (XCS) fraction of the heterophasic propylene copolymer (HECO2) has an intrinsic viscosity (IV) of in the range of 6.0 to 15.0 dl/g, wherein the xylene cold soluble (XCS) fraction of the heterophasic propylene copolymer (HECO2) comprises comonomer units derived from $C_2$ and/or $C_4$ to $C_{12}$ α-olefin in an amount in the range of 62 to 85 mol % and wherein the melt flow rate $MFR_2$ (230° C.) measured according to ISO 1133 of the heterophasic propylene copolymer (HECO2) is in the range of 0.1 to 6.0 g/10 min.

A third aspect is directed at a moulded article comprising the polypropylene composition (C) according to the first aspect or the heterophasic propylene copolymer (HECO2) according to the second aspect.

It is appreciated that the moulded article is an automotive article, preferably an exterior or interior automotive article selected from bumpers, body panels, rocker panels, side trims, step assists, spoilers and dash boards.

A fourth aspect is directed at the use of the polypropylene composition (C) according to the first aspect or the heterophasic propylene copolymer (HECO2) according to the second aspect to enhance paint adhesion of a moulded article.

In the following the invention will be described in more detail.

Polypropylene Composition (C)

According to a first aspect the present invention is directed at a polypropylene composition (C) comprising:
(i) 62 to 85 wt. %, preferably 62 to 80 wt.-%, more preferably 65 to 75 wt.-% of a heterophasic propylene copolymer (HECO1), based on the weight of the polypropylene composition (C);
(ii) 10 to 30 wt.-%, preferably 10 to 25 wt.-%, more preferably 10 to 20 wt.-% of a heterophasic propylene copolymer (HECO2), based on the weight of the polypropylene composition (C); and
(iii) 5 to 30 wt.-%, preferably 5 to 25 wt.-%, more preferably 10 to 20 wt.-% of an inorganic filler (F) based on the weight of the polypropylene composition (C).

It is appreciated that the polypropylene composition (C) has a rather low melt flow rate. Thus, the melt flow rate $MFR_2$ (230° C.) measured according to ISO 1133 of the polypropylene composition (C) is preferably in the range of 1.0 to 30.0 g/10 min, preferably in the range of 2.0 to 25.0 g/10 min, even more preferably in the range of 3.0 to 20.0 g/10 min, yet even more preferably in the range of 4.0 to 10.0 g/10 min.

It is appreciated that the polypropylene composition (C) comprises propylene and monomers co-polymerizable with propylene, for example comonomer units derived from ethylene and/or $C_4$ to $C_{12}$ α-olefins, preferably derived from ethylene and/or $C_4$ to $C_{10}$ α-olefins, more preferably derived from ethylene, 1-butene and/or 1-hexene, even more preferably derived from ethylene and/or 1-butene, yet even more preferably derived from ethylene.

Furthermore, it is appreciated that the polypropylene composition (C) comprises comonomer units in an amount in the range of 10 to 50 mol %, preferably in the range of 15 to 35 mol %, more preferably in the range of 20 to 30 mol %. According to one embodiment the polypropylene composition (C) comprises only comonomer units derived from ethylene, wherein the comonomer units are comprised in an amount in the range of 15 to 35 mol %.

Moreover, it is appreciated that the xylene cold soluble (XCS) fraction of the polypropylene composition (C) comprises comonomer units in an amount in the range of 25 to 70 mol %, preferably in the range of 40 to 65 mol %, more preferably in the range 50 to 60 mol %.

According to one embodiment the xylene cold soluble (XCS) fraction of the polypropylene composition (C) comprises comonomer units in an amount in the range of 40 to 65 mol %, wherein the comonomer units are derived from ethylene only.

In particular, it is appreciated that the polypropylene composition (C) fulfils in-equation (I), preferably in-equation (Ia), more preferably in-equation (Ib), even more preferably in-equation (Ic):

$$C_x(XCS)[HECO2]/C_x(XCS)[HECO1]>1.0 \quad (I)$$

$$3.5 \geq C_x(XCS)[HECO2]/C_x(XCS)[HECO1] \geq 1.0 \quad (Ia)$$

$$2.5 \geq C_x(XCS)[HECO2]/C_x(XCS)[HECO1] \geq 1.0 \quad (Ib)$$

$$2.0 \geq C_x(XCS)[HECO2]/C_x(XCS)[HECO1] \geq 1.0 \quad (Ic)$$

wherein
$C_x$ (XCS) [HECO2] is the amount [in mol %] of $C_2$ and/or $C_4$ to $C_{12}$ α-olefin derived comonomer units in the xylene cold soluble (XCS) fraction of the heterophasic propylene copolymer (HECO2)
$C_x$ (XCS) [HECO1] is the amount [in mol %] of $C_2$ and/or $C_4$ to $C_{12}$ α-olefin derived comonomer units in the xylene cold soluble (XCS) fraction of the heterophasic propylene copolymer (HECO1).

In other words, it is preferred that the xylene cold soluble (XCS) fraction of the heterophasic propylene copolymer (HECO1) has a lower amount [in mol %] of $C_2$ and/or $C_4$ to $C_{12}$ α-olefin derived comonomer units than the xylene cold soluble (XCS) fraction of the heterophasic propylene copolymer (HECO2).

Furthermore, it is appreciated that the polypropylene composition (C) has a xylene cold soluble (XCS) fraction in the range of 10.0 to 50.0 wt.-%, preferably in the range of 15.0 to 40.0 wt.-%, more preferably in the range of 20.0 to 35.0 wt.-%, even more preferably in the range of 22.0 to 30.0 wt.-%, based on the weight of the polypropylene composition (C).

Furthermore, it is appreciated that the intrinsic viscosity (IV) of the xylene cold soluble (XCS) fraction of the polypropylene composition (C) is in the range of 1.0 to 6.5 dl/g, preferably in the range of 2.0 to 5.5 dl/g, even more preferably in the range of 3.0 to 5.0 dl/g.

In particular, it is appreciated that the polypropylene composition (C) fulfils in-equation (II), preferably in-equation (IIa), more preferably in-equation (IIb), even more preferably in-equation (IIc), yet even more preferably in-equation (IId), most preferably in-equation (IIe):

$$IV(XCS)[HECO2]/IV(XCS)[HECO1]>1.0 \quad (II)$$

$$IV(XCS)[HECO2]/IV(XCS)[HECO1] \geq 2.0 \quad (IIa)$$

$$IV(XCS)[HECO2]/IV(XCS)[HECO1] \geq 3.0 \quad (IIb)$$

$$19.0 \geq IV(XCS)[HECO2]/IV(XCS)[HECO1] \geq 1.0 \quad (IIc)$$

$$10.0 \geq IV(XCS)[HECO2]/IV(XCS)[HECO1] \geq 2.0 \quad (IId)$$

$$5.0 \geq IV(XCS)[HECO2]/IV(XCS)[HECO1] \geq 3.0 \quad (IIe)$$

wherein
IV (XCS) [HECO2] is the intrinsic viscosity (IV) of the xylene cold soluble (XCS) fraction of the heterophasic propylene copolymer (HECO2)
IV (XCS) [HECO1] is the intrinsic viscosity (IV) of the xylene cold soluble (XCS) fraction of the heterophasic propylene copolymer (HECO1).

In other words, it is preferred that the xylene cold soluble (XCS) fraction of the heterophasic propylene copolymer (HECO1) has a lower intrinsic viscosity (IV) than the xylene cold soluble (XCS) fraction of the heterophasic propylene copolymer (HECO2).

It is appreciated that the polypropylene composition (C) has a flexural modulus in the range of 500 to 3500 MPa, preferably in the range of 1000 to 2000 MPa, more preferably in the range of 1300 to 1800 MPa.

Furthermore, it is appreciated that the polypropylene composition (C) has a good stiffness/impact balance. In particular, it is desirable that the polypropylene composition (C) exhibits a good impact behavior. Accordingly, it is preferred that the polypropylene composition (C) has Charpy Notched Impact Strength at +23° C. of at least 20.0 kJ/m², preferably in the range of 20.0 to 150.0 kJ/m², more preferably in the range of 30.0 to 100.0 kJ/m², even more preferably in the range of 45.0 to 65.0 kJ/m².

Preferably the polypropylene composition (C) comprises as main polymer components only the heterophasic propylene copolymer (HECO1) and the heterophasic propylene copolymer (HECO2). In other words, it is preferred that the polypropylene composition (C) comprises not more than 10.0 wt.-%, more preferably not more than 5.0 wt.-%, even more preferably not more than 2.0 wt.-%, based on the weight of the composition (C), of polymers other than the heterophasic propylene copolymer (HECO1) and the heterophasic propylene copolymer (HECO2). Such "other polymers" may be by-products obtained from the polymerization process or may be introduced into the polypropylene composition (C) in form of polymeric carrier material (PCM) for additives (AD).

The polypropylene composition (C) may contain additives (AD). Furthermore, the polypropylene composition (C) may comprise nucleating agents (NU), preferably α-nucleating agents (NU). Both will be described in more detail below.

Therefore, it is especially preferred that the polypropylene composition (C) consists of
(i) 62 to 85 wt. %, preferably 62 to 80 wt.-%, more preferably 65 to 75 wt.-% of heterophasic propylene copolymer (HECO1), based on the weight of the polypropylene composition (C);
(ii) 10 to 30 wt.-%, preferably 10 to 25 wt.-%, more preferably 10 to 20 wt.-% of heterophasic propylene copolymer (HECO2), based on the weight of the polypropylene composition (C);
(iii) 3 to 30 wt.-%, preferably 5 to 25 wt.-%, more preferably 10 to 20 wt.-% of inorganic filler (F), based on the weight of the polypropylene composition (C);
(iv) optionally up to 5.0 wt.-%, preferably $1.0 \times 10^{-4}$ to 4.0 wt.-%, more preferably $2.0 \times 10^{-4}$ to 2.0 wt.-% of nucleating agent (NU), based on the weight of the polypropylene composition (C); and
(v) optionally up to 10.0 wt.-%, preferably 0.1 to 5.0 wt.-%, more preferably 0.5 to 4.0 wt.-%, of additives (AD), based on the weight of the polypropylene composition (C).

In one embodiment the polypropylene composition (C) consists of:
(i) 62 to 85 wt. %, based on the weight of the polypropylene composition (C) of a heterophasic propylene copolymer (HECO1);
(ii) 10 to 30 wt.-%, based on the weight of the polypropylene composition (C) of a heterophasic propylene copolymer (HECO2);
(iii) 5 to 30 wt.-%, based on the weight of the polypropylene composition (C) of an inorganic filler (F);
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In one embodiment the polypropylene composition (C) consists of:
(i) 62 to 80 wt. %, based on the weight of the polypropylene composition (C) of a heterophasic propylene copolymer (HECO1);
(ii) 10 to 30 wt.-%, based on the weight of the polypropylene composition (C) of a heterophasic propylene copolymer (HECO2);
(iii) 5 to 30 wt.-%, based on the weight of the polypropylene composition (C) of an inorganic filler (F);
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In one embodiment the polypropylene composition (C) consists of:
(i) 65 to 75 wt. %, based on the weight of the polypropylene composition (C) of a heterophasic propylene copolymer (HECO1);
(ii) 10 to 30 wt.-%, based on the weight of the polypropylene composition (C) of a heterophasic propylene copolymer (HECO2);
(iii) 5 to 30 wt.-%, based on the weight of the polypropylene composition (C) of an inorganic filler (F);
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In one embodiment the polypropylene composition (C) consists of:
(i) 62 to 85 wt. %, based on the weight of the polypropylene composition (C) of a heterophasic propylene copolymer (HECO1);
(ii) 10 to 25 wt.-%, based on the weight of the polypropylene composition (C) of a heterophasic propylene copolymer (HECO2); and
(iii) 5 to 30 wt.-%, based on the weight of the polypropylene composition (C) of an inorganic filler (F);
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In one embodiment the polypropylene composition (C) consists of:
(i) 62 to 85 wt. %, based on the weight of the polypropylene composition (C) of a heterophasic propylene copolymer (HECO1);
(ii) 10 to 20 wt.-%, based on the weight of the polypropylene composition (C) of a heterophasic propylene copolymer (HECO2);
(iii) 5 to 30 wt.-%, based on the weight of the polypropylene composition (C) of an inorganic filler (F);
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In one embodiment the polypropylene composition (C) consists of:
(i) 62 to 85 wt. %, based on the weight of the polypropylene composition (C) of a heterophasic propylene copolymer (HECO1);
(ii) 10 to 30 wt.-%, based on the weight of the polypropylene composition (C) of a heterophasic propylene copolymer (HECO2);
(iii) 5 to 25 wt.-%, based on the weight of the polypropylene composition (C) of an inorganic filler (F);
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In one embodiment the polypropylene composition (C) consists of:
(i) 62 to 80 wt. %, based on the weight of the polypropylene composition (C) of a heterophasic propylene copolymer (HECO1);

(ii) 10 to 30 wt.-%, based on the weight of the polypropylene composition (C) of a heterophasic propylene copolymer (HECO2);
(iii) 10 to 20 wt.-%, based on the weight of the polypropylene composition (C) of an inorganic filler (F);
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In one embodiment the polypropylene composition (C) consists of:
(i) 62 to 80 wt. %, based on the weight of the polypropylene composition (C) of a heterophasic propylene copolymer (HECO1);
(ii) 10 to 25 wt.-%, based on the weight of the polypropylene composition (C) of a heterophasic propylene copolymer (HECO2);
(iii) 5 to 25 wt.-%, based on the weight of the polypropylene composition (C) of an inorganic filler (F)
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In one embodiment the polypropylene composition (C) consists of:
(i) 65 to 75 wt. %, based on the weight of the polypropylene composition (C) of a heterophasic propylene copolymer (HECO1);
(ii) 10 to 20 wt.-%, based on the weight of the polypropylene composition (C) of a heterophasic propylene copolymer (HECO2);
(iii) 10 to 20 wt.-%, based on the weight of the polypropylene composition (C) of an inorganic filler (F);
(iv) 0 to 5.0 wt.-%, based on the weight of the polypropylene composition (C) of nucleating agent (NU); and
(v) 0 to 10.0 wt.-%, based on the weight of the polypropylene composition (C) additives (AD).

In the following the individual components of the polypropylene composition (C) are described in more detail.

Heterophasic Propylene Copolymer (HECO1)

The polypropylene composition (C) comprises the heterophasic propylene copolymer (HECO1). as an essential component.

The heterophasic propylene copolymer (HECO1) comprises, preferably consists of, propylene and monomers co-polymerizable with propylene, for example comonomer units derived from ethylene and/or $C_4$ to $C_{12}$ α-olefins, preferably derived from ethylene and/or $C_4$ to $C_{10}$ α-olefins, more preferably derived from ethylene, 1-butene and/or 1-hexene, even more preferably derived from ethylene and/or 1-butene, yet even more preferably derived from ethylene. Thus, it is appreciated that the heterophasic propylene copolymer (HECO1) comprises, especially consists of, propylene and monomers co-polymerizable with propylene selected from the group consisting of ethylene, 1-butene and 1-hexene. In particular, it is appreciated that the heterophasic propylene copolymer (HECO1) comprises—apart from propylene—units derivable from ethylene and/or 1-butene. In a preferred embodiment the heterophasic propylene copolymer (HECO1) comprises propylene and units derivable from ethylene only.

It is appreciated that the heterophasic propylene copolymer (HECO1) has a melt flow rate $MFR_2$ (230° C.) measured according to ISO 1133 ≥6.0 g/10 min, preferably in the range of 6.0 to 50.0 g/10 min, more preferably in the range of 7.0 to 40.0 g/10 min, even more preferably in the range of 8.0 to 30.0 g/10 min.

Furthermore, it is appreciated that the heterophasic propylene copolymer (HECO1) has a xylene cold soluble (XCS) fraction in an amount in the range of 15.0 to 60.0 wt.-%, preferably in an amount in the range of 20.0 to 50.0 wt.-%, more preferably in an amount in the range of 25.0 to 40.0 0 wt.-%, even more preferably in an amount in the range of 25.0 to 35.00 wt.-%, based on the weight of the heterophasic propylene copolymer (HECO1).

Furthermore, it is appreciated that the xylene cold soluble (XCS) fraction of the heterophasic propylene copolymer (HECO1) has an intrinsic viscosity (IV) of in the range of 0.8 to 5.5 dl/g, preferably in the range of 1.0 to 5.0 dl/g, more preferably in the range of 1.5 to 4.0 dl/g, even more preferably in the range of 2.0 to 3.5 dl/g.

Furthermore, it is appreciated that the heterophasic propylene copolymer (HECO1) comprises comonomer units in an amount of ≤35 mol %, preferably in an amount in the range of 5 to 35 mol %, more preferably in an amount in the range of 10 to 30 mol %, even more preferably in an amount in the range of 10 to 25 mol %.

Furthermore, it is appreciated that the xylene cold soluble (XCS) fraction of the heterophasic propylene copolymer (HECO1) comprises comonomer units in an amount of ≤60 mol %, preferably in an amount in the range of 15 to 60 mol %, more preferably in an amount in the range of 25 to 60 mol %, even more preferably in an amount in the range of 35 to 55 mol %.

The expression "heterophasic propylene copolymer" or "heterophasic" as used in the instant invention indicates that an elastomeric propylene copolymer is (finely) dispersed in a (semi)crystalline polypropylene. In other words, the (semi)crystalline polypropylene constitutes a matrix in which the elastomeric propylene copolymer forms inclusions in the matrix, i.e. in the (semi)crystalline polypropylene. Thus, the matrix contains (finely) dispersed inclusions being not part of the matrix and said inclusions contain the elastomeric propylene copolymer. The term "inclusion" according to this invention shall preferably indicate that the matrix and the inclusion form different phases within the heterophasic system, said inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Thus, the heterophasic propylene copolymer (HECO1) comprises a (semi)crystalline polypropylene matrix (PM1) and an elastomeric propylene copolymer (EPR1) dispersed in said (semi)crystalline polypropylene matrix (PM1).

Preferably the weight ratio between the (semi)crystalline polypropylene matrix (PM1) and the elastomeric propylene copolymer (EPR1) [PM1/EPR1] of the heterophasic composition (HECO1) is in the range of 90/10 to 30/70, more preferably in the range of 80/20 to 45/55, yet more preferably in the range of 75/25 to 55/45.

It one embodiment the heterophasic propylene copolymer (HECO1) has a melt flow rate $MFR_2$ (230° C.) measured according to ISO 1133 in the range of 6.0 to 50.0 g/10 min, wherein the xylene cold soluble (XCS) fraction
(i) has an intrinsic viscosity (IV) of in the range of 0.8 to 5.5 dl/g,
and
(ii) comprises comonomer units in an amount in the range of 15 to 60 mol %.

It one embodiment the heterophasic propylene copolymer (HECO1) has a melt flow rate $MFR_2$ (230° C.) measured according to ISO 1133 in the range of 6.0 to 50.0 g/10 min, wherein the xylene cold soluble (XCS) fraction
(i) has an intrinsic viscosity (IV) of in the range of 1.0 to 5.0 dl/g,
and
(ii) comprises comonomer units in an amount in the range of 15 to 60 mol %.

It one embodiment the heterophasic propylene copolymer (HECO1) has a melt flow rate $MFR_2$ (230° C.) measured according to ISO 1133 in the range of 6.0 to 50.0 g/10 min, wherein the xylene cold soluble (XCS) fraction
(i) has an intrinsic viscosity (IV) of in the range of 1.5 to 4.0 dl/g,
and
(ii) comprises comonomer units in an amount in the range of 15 to 60 mol %.

It one embodiment the heterophasic propylene copolymer (HECO1) has a melt flow rate $MFR_2$ (230° C.) measured according to ISO 1133 in the range of 6.0 to 50.0 g/10 min, wherein the xylene cold soluble (XCS) fraction
(i) has an intrinsic viscosity (IV) of in the range of 2.0 to 3.5 dl/g,
and
(ii) comprises comonomer units in an amount in the range of 15 to 60 mol %.

It one embodiment the heterophasic propylene copolymer (HECO1) has a melt flow rate $MFR_2$ (230° C.) measured according to ISO 1133 in the range of 6.0 to 50.0 g/10 min, wherein the xylene cold soluble (XCS) fraction
(i) has an intrinsic viscosity (IV) of in the range of 0.8 to 5.5 dl/g,
and
(ii) comprises comonomer units in an amount in the range of 25 to 60 mol %.

It one embodiment the heterophasic propylene copolymer (HECO1) has a melt flow rate $MFR_2$ (230° C.) measured according to ISO 1133 in the range of 6.0 to 50.0 g/10 min, wherein the xylene cold soluble (XCS) fraction
(i) has an intrinsic viscosity (IV) of in the range of 0.8 to 5.5 dl/g, and
(ii) comprises comonomer units in an amount in the range of 35 to 55 mol %.

It one embodiment the heterophasic propylene copolymer (HECO1) has a melt flow rate $MFR_2$ (230° C.) measured according to ISO 1133 in the range of 6.0 to 50.0 g/10 min, wherein the xylene cold soluble (XCS) fraction
(i) has an intrinsic viscosity (IV) of in the range of 1.0 to 5.0 dl/g,
and
(ii) comprises comonomer units in an amount in the range of 25 to 60 mol %.

It one embodiment the heterophasic propylene copolymer (HECO1) has a melt flow rate $MFR_2$ (230° C.) measured according to ISO 1133 in the range of 6.0 to 50.0 g/10 min, wherein the xylene cold soluble (XCS) fraction
(i) has an intrinsic viscosity (IV) of in the range of 1.5 to 4.0 dl/g,
and
(ii) comprises comonomer units in an amount in the range of 35 to 55 mol %.

The heterophasic propylene copolymer (HECO1) can be nucleated. In this case the heterophasic propylene copolymer (HECO1) contains a nucleating agent (NU), preferably an α-nucleating agent, in an amount of up to 5 wt.-%, preferably in an amount of up to 1 wt.-%, based on the weight of the heterophasic propylene copolymer (HECO1). It is appreciated that the heterophasic propylene copolymer (HECO1) contains a nucleating agent (NU), preferably an α-nucleating agent, in an amount in the range of 1 to 200 ppm, preferably in an amount in the range of 5 to 100 ppm. In a preferred embodiment the nucleating agent (NU) is an α-nucleating agent, in particular an α-nucleating agent selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, vinylcycloalkane polymer, vinylalkane polymer, and mixtures thereof. It is especially preferred that the heterophasic propylene copolymer (HECO1) contains a vinylcycloalkane polymer, like vinylcyclohexane (VCH) polymer, and/or vinylalkane polymer.

In one embodiment the heterophasic propylene copolymer (HECO1) contains vinylcyclohexane (VCH) polymer, which is introduced into the heterophasic propylene copolymer (HECO1) by the BNT technology, described in more detail below.

It is appreciated that the heterophasic propylene copolymer (HECO1) is not modified. In particular, it is appreciated that the heterophasic propylene copolymer (HECO1) is not modified by treatment with a peroxide (PO).

Polypropylene Matrix (PM1)

The first component of the heterophasic propylene copolymer (HECO1) is the (semi)crystalline polypropylene matrix (PM1).

The (semi)crystalline polypropylene matrix (PM1) is preferably a (semi)crystalline random propylene copolymer (R-PP1) or a (semi)crystalline propylene homopolymer (H-PP1), the latter being especially preferred.

The expression a "propylene homopolymer" used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment, only propylene units are detectable in the (semi)crystalline propylene homopolymer (H-PP1).

In case the (semi)crystalline polypropylene matrix (PM1) is a (semi)crystalline random propylene copolymer (R-PP1) it is appreciated that the (semi)crystalline random propylene copolymer (R-PP1) comprises, preferably consists of, propylene and monomers co-polymerizable with propylene, for example comonomer units derived from ethylene and/or $C_4$ to $C_{12}$ α-olefins, preferably derived from ethylene and/or $C_4$ to $C_{10}$ α-olefins, more preferably derived from ethylene, 1-butene and/or 1-hexene, even more preferably derived from ethylene and/or 1-butene, yet even more preferably derived from ethylene. Thus, it is appreciated that the (semi)crystalline random propylene copolymer (R-PP1) comprises, especially consists of, propylene and monomers co-polymerizable with propylene selected from the group consisting of ethylene, 1-butene and 1-hexene. More specifically, it is appreciated that the (semi)crystalline random propylene copolymer (R-PP1) comprises—apart from propylene—units derivable from ethylene and/or 1-butene. In a preferred embodiment the (semi)crystalline random propylene copolymer (R-PP1) comprises propylene and units derivable from ethylene only.

It is appreciated that (semi)crystalline polypropylene matrix (PM1), like (semi)crystalline propylene homopolymer (H-PP1) comprises comonomer units in an amount of ≤5 mol %, preferably in an amount of ≤2 mol %, more preferably in an amount of ≤1 mol %.

In one embodiment the (semi)crystalline polypropylene matrix (PM1) is a propylene homopolymer.

Furthermore, it is appreciated that (semi)crystalline polypropylene matrix (PM1), like (semi)crystalline propylene homopolymer (H-PP1), has a melt flow rate $MFR_2$ (230° C.) measured according to ISO 1133 in the range of 10 to 150 g/10 min, preferably in the range of 20 to 100 g/10 min, more preferably in the range of 30 to 80 g/10 min.

Moreover, it is preferred that the (semi)crystalline polypropylene matrix (PM1) has a xylene cold soluble (XCS) fraction of ≤10 wt.-%, preferably in the range of 0 to 5 wt.-%, more preferably in the range of 0 to 3 wt.-%, even more preferably in the range of 0 to 2 wt.-%, based on the weight of the (semi)crystalline polypropylene matrix (PM1).

Elastomeric Propylene Copolymer Rubber (EPR1)

The second component of the heterophasic composition (HECO1) is the elastomeric propylene copolymer rubber (EPR1).

The elastomeric propylene copolymer rubber (EPR1) comprises, preferably consists of, propylene and monomers co-polymerizable with propylene, for example comonomer units derived from ethylene and/or $C_4$ to $C_{12}$ α-olefins, preferably derived from ethylene and/or $C_4$ to $C_{10}$ α-olefins, more preferably derived from ethylene, 1-butene and 1-hexene, even more preferably derived from ethylene and/or 1-butene, yet even more preferably derived from ethylene. Thus, it is appreciated that the elastomeric propylene copolymer rubber (EPR1) comprises, especially consists of, propylene and monomers co-polymerizable with propylene selected from the group consisting of ethylene, 1-butene and 1-hexene. More specifically, it is appreciated that the elastomeric propylene copolymer rubber (EPR1) comprises—apart from propylene—units derivable from ethylene and/or 1-butene. In a preferred embodiment the elastomeric propylene copolymer rubber (EPR1) comprises propylene and units derivable from ethylene only.

It is appreciated that the elastomeric propylene copolymer rubber (EPR1) comprises comonomer units in an amount of ≤70 mol %, preferably in the range of 25 to 70 mol %, more preferably in the range of 35 to 65 mol %, even more preferably in the range of 40 to 60 mol %.

Preparation of the Heterophasic Propylene Copolymer (HECO1)

The heterophasic propylene copolymer (HECO1) can be produced by blending the (semi)crystalline polypropylene matrix (PM1) and the elastomeric propylene copolymer rubber (EPR1). However, it is preferred that the heterophasic propylene copolymer (HECO1) is produced in a sequential step process, using reactors in serial configuration and operating at different reaction conditions. As a consequence, each fraction prepared in a specific reactor may have its own molecular weight distribution and/or comonomer content distribution.

Accordingly, the heterophasic propylene copolymer (HECO1) can be obtained by a sequential polymerization process wherein the (semi)crystalline polypropylene matrix (PM1), preferably the (semi)crystalline propylene homopolymer matrix (HPP-1) is produced in a first reactor (R1) and optionally in a second reactor (R2), and wherein the elastomeric propylene copolymer rubber (EPR1) is produced in one or more subsequent reactors to obtain the heterophasic propylene copolymer (HECO1). For a continuous multi-reactor polymerization setup, the reactors are separated by space, e.g. the first reactor (R1) and the second reactor (R2) are separate standalone vessels, in which the (semi)crystalline polypropylene matrix (PM1), produced in the first reactor (R1), is being continuously supplied to the second reactor (R2). For a bench-scale laboratory batch single reactor polymerization setup the reactors are separated by time, e.g. the first reactor (R1) and the second reactor (R2) are the same vessel, in which the (semi)crystalline polypropylene matrix (PM1) is produced first according to the first reactor (R1) specific conditions for a certain time (e.g. bulk polymerization), and then the resulting material is subjected to the second reactor (R2) specific conditions for a certain time (e.g. gas phase polymerization) staying physically in the same single polymerization reactor.

In one embodiment, the heterophasic propylene copolymer (HECO1) is obtained by a sequential polymerization process wherein the (semi)crystalline polypropylene matrix (PM1), preferably the (semi)crystalline propylene homopolymer matrix (HPP-1) is produced in a first reactor (R1) and wherein the elastomeric propylene copolymer rubber (EPR1) is produced in a second reactor (R2) to obtain the heterophasic propylene copolymer (HECO1).

In one embodiment, the heterophasic propylene copolymer (HECO1) is obtained by a sequential polymerization process wherein the (semi)crystalline polypropylene matrix (PM1), preferably the (semi)crystalline propylene homopolymer matrix (HPP-1) is produced in a first reactor (R1) and a second reactor (R2) and wherein the elastomeric propylene copolymer rubber (EPR1) is produced in a third reactor (R3) to obtain the heterophasic propylene copolymer (HECO1).

In one embodiment, the heterophasic propylene copolymer (HECO1) is obtained by a sequential polymerization process wherein the (semi)crystalline polypropylene matrix (PM1), preferably the (semi)crystalline propylene homopolymer matrix (HPP-1) is produced in a first reactor (R1) and a second reactor (R2) and wherein the elastomeric propylene copolymer rubber (EPR1) is produced in a third reactor (R3) and a fourth rector (R4) to obtain the heterophasic propylene copolymer (HECO1).

Accordingly, the present process comprises at least a first reactor (R1) and a second reactor (R2). For example, the process may comprise at least a first reactor (R1), a second reactor (R2), optionally a third reactor (R3) and optionally a fourth reactor (R4), preferably a first reactor (R1), a second reactor (R2), a third reactor (R3) and a fourth reactor (R4).

The term "sequential polymerization process" indicates that the heterophasic propylene copolymer is produced in at least two reactors, preferably in three reactors or more, connected in series. The term "polymerization reactor" shall indicate that the main polymerization takes place. Thus, in case the process consists of two, three or four polymerization reactors, this definition does not exclude the option that the overall process comprises for instance a prepolymerization step in a prepolymerization reactor. The term "consist of" is only a closing formulation in view of the main polymerization reactors.

It is appreciated that after a first reactor (R1) and an optional second reactor (R2) the (semi)crystalline polypropylene matrix (PM1), preferably the (semi)crystalline propylene homopolymer matrix (HPP-1) of the heterophasic propylene copolymer (HECO1), is obtained. The (semi)crystalline polypropylene matrix (PM1), preferably the (semi)crystalline propylene homopolymer matrix (HPP-1) is subsequently transferred into at least one further reactor, in which elastomeric propylene copolymer rubber (EPR1) is produced and the heterophasic propylene copolymer (HECO1) is obtained.

The first reactor (R1) is preferably a slurry reactor (SR) and can be any continuous or simple stirred batch tank reactor or loop reactor (LR) operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the optional third reactor (R3) and the optional fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first reactor (R1) is a slurry reactor (SR), like loop reactor (LR), whereas the second reactor (R2), the optional third reactor (R3) and the optional fourth reactor (R4) are gas phase reactors (GPR). Accordingly, for the instant process at least two, preferably three or four polymerization reactors, namely a slurry reactor (SR), like loop reactor (LR), a first gas phase reactor (GPR1), an optional second gas phase reactor (GPR2) and an optional a third gas phase reactor (GPR3) connected in series are used. If needed prior to the slurry reactor (SR) a prepolymerization reactor is placed.

In one embodiment the first reactor (R1) is a slurry reactors (SR) and the second reactor (R2), the optional third reactor (R3) and the optional fourth reactor (R4) are gas phase reactors.

In a preferred embodiment the heterophasic propylene copolymer (HECO1) is obtained from a process comprising a first reactor (R1), a second reactor (R2), a third reactor (R3) and a fourth reactor (R4), wherein the polypropylene matrix (PM1) is prepared in the first reactor (R1), being a loop reactor (LR) and the second reactor (R2), being a first gas phase reactor (GPR1), and wherein the elastomeric propylene copolymer rubber (EPR1) is prepared in the third reactor (R3), being a second gas phase reactor (GPR2) and the fourth reactor, being a third gas phase reactor (GPR3).

A preferred multistage process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably the conditions for the slurry reactor (SR), like a loop reactor (LR), may be as follows:
the temperature is within the range of 40° C. to 110° C., preferably between 60° C. and 100° C., like 68 to 95° C.,
the pressure is within the range of 2 bar to 80 bar, preferably between 30 bar to 60 bar,
hydrogen can be added for controlling the molar mass in a manner known per se, either continuously or batchwise, depending on the process type employed.

Preferably the conditions for the gas phase reactors (GPR-1), (GPR-2) and (GPR-3) respectively may be as follows:
the temperature is within the range of 50° C. to 130° C., preferably between 60° C. and 100° C.,
the pressure is within the range of 5 bar to 50 bar, preferably between 12 bar to 35 bar,
hydrogen can be added for controlling the molar mass in a manner known per se, either continuously or batchwise, depending on the process type employed.

The residence time can vary in the different reactors. It is appreciated that the residence time in the slurry reactor (SR), like a loop reactor (LR), is in the range of 0.2 to 4 hours, e.g. 0.3 to 1.5 hours and the residence time in the gas phase reactors (GPR1), (GPR2) and (GPR3) respectively is in the range of 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR1), (GPR2) and (GPR3).

The process may also comprise a prepolymerization with the catalyst system used. In a preferred embodiment, the prepolymerization is conducted as bulk slurry polymerization in liquid propylene, i.e. the liquid phase mainly comprises propylene, with minor amount of other reactants and optionally inert components dissolved therein. The prepolymerization reaction is typically conducted at a temperature of 0 to 50° C., preferably from 10 to 45° C., and more preferably from 15 to 40° C. The pressure in the continuous prepolymerization reactor must be higher than that in the subsequent slurry reactor (SR), like the loop reactor (LR) to prevent backflow from the slurry reactor (SR) back to the prepolymerization reactor, typically 1 bar higher. Thus, the pressure in the prepolymerization reactor may be from 10 to 100 bar, for example 31 to 70 bar. For a bench-scale batch polymerization system, the pressure is not critical but must be sufficiently high to maintain the reaction mixture in liquid phase (10-25 bar depending on temperature).

The precise control of the prepolymerization conditions and reaction parameters is within the skill of the art.

According to the invention, the heterophasic propylene copolymer (HECO1) is obtained by a sequential polymerization process, as described above, in the presence of a catalyst system. It is appreciated that there are no specific restrictions regarding the catalyst system as long as a Ziegler-Natta catalyst is used. As regards catalyst systems suitable for preparing the heterophasic propylene copolymer (HECO1), reference is made to e.g. WO2014/023603, EP591224, WO2012/007430, EP2610271, EP 261027 and EP2610272, which are incorporated herein by reference.

In one embodiment the heterophasic propylene copolymer (HECO1) is prepared in presence of a Ziegler-Natta-catalyst as described for the preparation of the heterophasic propylene copolymer (HECO2)

Heterophasic Propylene Copolymer (HECO2)

As mentioned above, the polypropylene composition (C) according to the present invention comprises as an essential component a heterophasic propylene copolymer (HECO2).

The heterophasic propylene copolymer (HECO2) comprises, preferably consists of, propylene and monomers co-polymerizable with propylene, for example comonomer units derived from ethylene and/or $C_4$ to $C_{12}$ α-olefins, preferably derived from ethylene and/or $C_4$ to $C_{10}$ α-olefins, more preferably derived from ethylene, 1-butene and/or 1-hexene, even more preferably derived from ethylene and/or 1-butene, yet even more preferably derived from ethylene. Thus, it is appreciated that the heterophasic propylene copolymer (HECO2) comprises, especially consists of, propylene and monomers co-polymerizable with propylene selected from the group consisting of ethylene, 1-butene and 1-hexene. More specifically, it is appreciated that the heterophasic propylene copolymer (HECO2) comprises—apart from propylene—units derivable from ethylene and/or 1-butene. In a preferred embodiment the heterophasic propylene copolymer (HECO2) comprises propylene and units derivable from ethylene only.

It is appreciated that the heterophasic propylene copolymer (HECO2) has a melt flow rate $MFR_2$ (230° C.) measured according to ISO 1133 of ≤6.0 g/10 min, preferably in the range of 0.1 to 5.5 g/10 min, more preferably in the range of 0.2 to 5.0 g/10 min, even more preferably in the range of 0.2 to 4.0 g/10 min; yet even more preferably in the range of 0.3 to 3.0 g/10 min.

Furthermore, it is appreciated that the heterophasic propylene copolymer (HECO2) has a xylene cold soluble (XCS) fraction in the range of 15.0 to 60.0 wt.-%, preferably in the range of 20.0 to 50.0 wt.-%, more preferably in the range of 25.0 to 40.0 wt.-%, even more preferably in the range of 25.0 to 35.0 wt.-%, based on the weight of the heterophasic propylene copolymer (HECO2).

Furthermore, it is appreciated that the xylene cold soluble (XCS) fraction of the heterophasic propylene copolymer (HECO2) has an intrinsic viscosity (IV) of in the range of 6.0 to 15.0 dl/g, preferably in the range of 6.5 to 12.0 dl/g, more preferably in the range of 8.0 to 11.0 dl/g, even more preferably in the range of 8.5 to 10.5 dl/g.

Furthermore, it is appreciated that the heterophasic propylene copolymer (HECO2) comprises comonomer units in an amount of ≥35 mol %, preferably in an amount in the range of 35 to 60 mol %, more preferably in an amount in the range of 35 to 55 mol %, even more preferably in an amount in the range of 40 to 50 mol. %.

Furthermore, it is appreciated that the xylene cold soluble (XCS) fraction of the heterophasic propylene copolymer (HECO2) comprises comonomer units in an amount of ≥62 mol %, preferably in an amount in the range of 62 to 85 mol %, more preferably in an amount in the range of 62 to 75 mol %, even more preferably in an amount in the range of 65 to 73 mol %.

In view of the above it becomes apparent that the heterophasic propylene copolymer (HECO2) is chemically different to the heterophasic propylene copolymer (HECO1).

As indicated above the expression "heterophasic propylene copolymer" or "heterophasic" as used in the instant invention indicates that an elastomeric propylene copolymer is (finely) dispersed in a (semi)crystalline polypropylene. Thus, the heterophasic propylene copolymer (HECO2) comprises a (semi)crystalline polypropylene matrix (PM2) and an elastomeric propylene copolymer (EPR2) dispersed in said (semi)crystalline matrix (PM2).

Preferably the weight ratio between the (semi)crystalline polypropylene matrix (PM2) and the elastomeric propylene copolymer (EPR2) [PM2/EPR2] of the heterophasic composition (HECO1) is in the range of 20/80 to 80/20, more preferably in the range of 30/70 to 70/30, yet more preferably in the range of 40/60 to 60/40.

It one embodiment the heterophasic propylene copolymer (HECO2) has a melt flow rate $MFR_2$ (230° C.) measured according to ISO 1133 in the range of 0.1 to 6.0 g/10 min, wherein the xylene cold soluble (XCS) fraction
(i) has an intrinsic viscosity (IV) of in the range of 6.0 to 15.0 dl/g,
and
(ii) comprises comonomer units in an amount in the range of 62 to 85 mol %.

It one embodiment the heterophasic propylene copolymer (HECO2) has a melt flow rate $MFR_2$ (230° C.) measured according to ISO 1133 in the range of 0.1 to 6.0 g/10 min, wherein the xylene cold soluble (XCS) fraction
(i) has an intrinsic viscosity (IV) of in the range of 6.5 to 12.0 dl/g,
and
(ii) comprises comonomer units in an amount in the range of 62 to 85 mol %.

It one embodiment the heterophasic propylene copolymer (HECO2) has a melt flow rate $MFR_2$ (230° C.) measured according to ISO 1133 in the range of 0.1 to 6.0 g/10 min, wherein the xylene cold soluble (XCS) fraction
(i) has an intrinsic viscosity (IV) of in the range of 8.0 to 11.0 dl/g,
and
(ii) comprises comonomer units in an amount in the range of 62 to 85 mol %.

It one embodiment the heterophasic propylene copolymer (HECO2) has a melt flow rate $MFR_2$ (230° C.) measured according to ISO 1133 in the range of 0.1 to 5.5 g/10 min, wherein the xylene cold soluble (XCS) fraction
(i) has an intrinsic viscosity (IV) of in the range of 8.5 to 10.5 dl/g,
and
(ii) comprises comonomer units in an amount in the range of 62 to 85 mol %.

It one embodiment the heterophasic propylene copolymer (HECO2) has a melt flow rate $MFR_2$ (230° C.) measured according to ISO 1133 in the range of 0.1 to 6.0 g/10 min, wherein the xylene cold soluble (XCS) fraction
(i) has an intrinsic viscosity (IV) of in the range of 6.0 to 15.0 dl/g,
and
(ii) comprises comonomer units in an amount in the range of 62 to 75 mol %.

It one embodiment the heterophasic propylene copolymer (HECO2) has a melt flow rate $MFR_2$ (230° C.) measured according to ISO 1133 in the range of 0.1 to 5.5 g/10 min, wherein the xylene cold soluble (XCS) fraction
(i) has an intrinsic viscosity (IV) of in the range of 6.0 to 15.0 dl/g,
and
(ii) comprises comonomer units in an amount in the range of 65 to 70 mol %.

It one embodiment the heterophasic propylene copolymer (HECO2) has a melt flow rate $MFR_2$ (230° C.) measured according to ISO 1133 in the range of 0.1 to 5.5 g/10 min, wherein the xylene cold soluble (XCS) fraction
(i) has an intrinsic viscosity (IV) of in the range of 6.5 to 12.0 dl/g,
and
(ii) comprises comonomer units in an amount in the range of 62 to 75 mol %.

It one embodiment the heterophasic propylene copolymer (HECO2) has a melt flow rate $MFR_2$ (230° C.) measured according to ISO 1133 in the range of 0.1 to 6.0 g/10 min, wherein the xylene cold soluble (XCS) fraction
(i) has an intrinsic viscosity (IV) of in the range of 8.0 to 11.0 dl/g,
and
(ii) comprises comonomer units in an amount in the range of 62 to 75 mol %.

It one embodiment the heterophasic propylene copolymer (HECO2) has a melt flow rate $MFR_2$ (230° C.) measured according to ISO 1133 in the range of 0.1 to 6.0 g/10 min, wherein the xylene cold soluble (XCS) fraction
(i) has an intrinsic viscosity (IV) of in the range of 8.5 to 10.5 dl/g,
and
(ii) comprises comonomer units in an amount in the range of 65 to 70 mol %.

It is appreciated that the heterophasic propylene copolymer (HECO2) is not modified. In particular, it is appreciated that the heterophasic propylene copolymer (HECO2) is not modified by treatment with a peroxide (PO).

The heterophasic propylene copolymer (HECO2) can be nucleated. In this case the heterophasic propylene copolymer (HECO2) contains a nucleating agent (NU), preferably an α-nucleating agent, in an amount of up to 5 wt.-%, preferably in an amount of up to 1 wt.-%, based on the weight of the heterophasic propylene copolymer (HECO2). It is appreciated that the heterophasic propylene copolymer (HECO2) contains a nucleating agent (NU), preferably an α-nucleating agent, in an amount in the range of 1 to 200 ppm, preferably in an amount in the range of 5 to 100 ppm. In a preferred embodiment the nucleating agent (NU) is an α-nucleating agent, in particular an α-nucleating agent selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, vinylcycloalkane polymer, vinylalkane polymer, and mixtures thereof. It is especially preferred that the heterophasic propylene copolymer (HECO2) contains a vinylcycloalkane polymer, like vinylcyclohexane (VCH) polymer, and/or vinylalkane polymer.

In one embodiment the heterophasic propylene copolymer (HECO2) contains vinylcyclohexane (VCH) polymer, which is introduced into the heterophasic propylene copolymer (HECO1) by the BNT technology.

Polypropylene Matrix (PM2)

The first component of the heterophasic propylene copolymer (HECO2) is the (semi)crystalline polypropylene matrix (PM2).

The (semi)crystalline polypropylene matrix (PM2) is preferably a (semi)crystalline random propylene copolymer (R-PP2) or a (semi)crystalline propylene homopolymer (H-PP2), the latter being especially preferred.

In case the (semi)crystalline polypropylene matrix (PM2) is a (semi)crystalline random propylene copolymer (R-PP2) it is appreciated that the (semi)crystalline random propylene copolymer (R-PP2) comprises, preferably consists of, propylene and monomers co-polymerizable with propylene, for example comonomer units derived from ethylene and/or $C_4$ to $C_{12}$ α-olefins, preferably derived from ethylene and/or $C_4$ to $C_{10}$ α-olefins, more preferably derived from ethylene, 1-butene and/or 1-hexene, even more preferably derived from ethylene and/or 1-butene, yet even more preferably derived from ethylene. Thus, it is appreciated that the (semi)crystalline random propylene copolymer (R-PP2) comprises, especially consists of, propylene and monomers co-polymerizable with propylene selected from the group consisting of ethylene, 1-butene and 1-hexene. More specifically, it is appreciated that the (semi)crystalline random propylene copolymer (R-PP2) comprises—apart from propylene—units derivable from ethylene and/or 1-butene. In a preferred embodiment the (semi)crystalline random propylene copolymer (R-PP2) comprises propylene and units derivable from ethylene only.

It is appreciated that (semi)crystalline polypropylene matrix (PM2), like (semi)crystalline propylene homopolymer (H-PP2) comprises comonomer units in an amount of ≤5 mol %, preferably in an amount of ≤2 mol %, more preferably in an amount of ≤1 mol %.

Furthermore, it is appreciated that (semi)crystalline polypropylene matrix (PM2), like (semi)crystalline propylene homopolymer matrix (H-PP2), has a melt flow rate $MFR_2$ (230° C.) measured according to ISO 1133 in the range of 10 to 1000 g/10 min, preferably in the range of 100 to 800 g/10 min, more preferably in the range of 250 to 800 g/10 min, even more preferably in the range of 300 to 700 g/10 min.

Moreover, it is preferred that the (semi)crystalline polypropylene matrix (PM2), like (semi)crystalline propylene homopolymer matrix (H-PP2), has a xylene cold soluble (XCS) fraction of ≤10 wt.-%, preferably in the range of 0 to 5.0 wt.-%, more preferably in the range of 0.1 to 3.5 wt.-%, even more preferably in the range of 1.0 to 3.0 wt.-%, based on the weight of the (semi)crystalline polypropylene matrix (PM2).

In view of the above it becomes apparent that preferably the (semi)crystalline polypropylene matrix (PM2) is chemically different to the (semi)crystalline polypropylene matrix (PM1).

Elastomeric Propylene Copolymer Rubber (EPR2)

The second component of the heterophasic composition (HECO2) is the elastomeric propylene copolymer rubber (EPR2).

The elastomeric propylene copolymer rubber (EPR2) comprises, preferably consists of, propylene and monomers co-polymerizable with propylene, for example comonomer units derived from ethylene and/or $C_4$ to $C_{12}$ α-olefins, preferably derived from ethylene and/or $C_4$ to $C_{10}$ α-olefins, more preferably derived from ethylene, 1-butene and/or 1-hexene, even more preferably derived from ethylene and/or 1-butene, yet even more preferably derived from ethylene. Thus, it is appreciated that the elastomeric propylene copolymer rubber (EPR2) comprises, especially consists of, propylene and monomers co-polymerizable with propylene selected from the group consisting of ethylene, 1-butene and 1-hexene. More specifically, it is appreciated that the elastomeric propylene copolymer rubber (EPR2) comprises—apart from propylene—units derivable from ethylene and/or 1-butene. In a preferred embodiment the elastomeric propylene copolymer rubber (EPR2) comprises propylene and units derivable from ethylene only.

It is appreciated that the elastomeric propylene copolymer rubber (EPR2) comprises comonomer units in an amount of ≥40 mol %, preferably in the range of 40 to 95 mol %, more preferably in the range of 50 to 95 mol %, even more preferably in the range of 60 to 90 mol %, yet even more preferably in the range of 65 to 75 mol %.

In view of the above it becomes apparent that preferably the elastomeric propylene copolymer rubber (EPR2) is chemically different to the elastomeric propylene copolymer rubber (EPR1)

As indicated above, the present invention enables a skilled person to produce molded articles having a good stiffness, good impact balance and high paint adhesion without the necessity to apply adhesion promoters such as primers. In particular, it is a finding of the present invention that a polypropylene composition with good stiffness, good impact balance and high paint adhesion can be obtained when providing a heterophasic propylene copolymer with a dispersed phase having both a high molecular weight and a high comonomer, such as the heterophasic propylene copolymer (HECO2).

Thus, according to a second aspect the present invention is directed at the heterophasic propylene copolymer (HECO2).

As indicated above it is a finding of the present invention to provide heterophasic propylene copolymer (HECO2) having a high molecular weight dispersed phase with high comonomer content. By providing a high molecular weight dispersed phase with high comonomer content to a polypropylene composition the elongation of dispersed rubber particles is reduced under shear stress thus leading to a more round-shaped elastomer phase favoring good surface appearance.

Preparation of the Heterophasic Propylene Copolymer (HECO2)

The heterophasic propylene copolymer (HECO2) is obtained by a multistage polymerization process. It is appreciated that the polymerization can be conducted as described for the preparation of the heterophasic propylene copolymer (HECO1). In other words, the process described for the preparation of the heterophasic propylene copolymer (HECO1) can also be applied for the preparation of the heterophasic propylene copolymer (HECO2).

However, in a preferred embodiment the heterophasic propylene copolymer (HECO2) is obtained from a process comprising a first reactor (R1) and a second reactor (R2), wherein the polypropylene matrix (PM2) is prepared in the first reactor (R1), being a bulk slurry reactor (SR) and wherein the elastomeric propylene copolymer rubber (EPR2) is prepared in the second reactor (R2), being a gas phase reactor (GPR).

Preparation of the Ziegler-Natta Catalyst (ZN-C)

The heterophasic propylene copolymer (HECO2) is prepared in presence of a Ziegler-Natta catalyst (ZN-C). Preferably, the heterophasic propylene copolymer (HECO2) is prepared in presence of a specific Ziegler-Natta catalyst (ZN-C), which will be described in more detail in the following:

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is self-supported.

The Ziegler-Natta catalyst (ZN-C) can be further defined by the way as obtained. Accordingly, the Ziegler-Natta catalyst (ZN-C) is preferably obtained by a process comprising the steps of a)
- $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
  or
- $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;
  or
- $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)—solidification method depending on the physical conditions, especially temperature used in steps b) and c). In both methods (precipitation or emulsion-solidification) the catalyst chemistry is the same. In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c). In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx). Preferably the Group 2 metal (MC) is magnesium. The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention. Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred. Illustrative monohydric alcohols (B) are of formula ROH, with R being straight-chain or branched $C_6$-$C_{10}$ alkyl residue. The most preferred monohydric alcohol is 2-ethyl-1-hexanol or octanol. Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium. It is also possible that magnesium compound can react in addition to the alcohol (A) and alcohol (B) also with a polyhydric alcohol (C) of formula R″(OH)$_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6. The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 m²/g, more preferably below 10 m²/g. Typically, the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

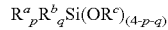

$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

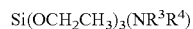

$$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the cyclohexylmethyl dimethoxy silane (C-donor) or the dicyclopentyl dimethoxy silane (D-donor), the latter especially preferred.

In addition to the Ziegler-Natta catalyst (ZN-C) and the optional external donor (ED) a cocatalyst needs to be used. The cocatalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the cocatalyst (Co) is a trialkylaluminium, like triethylaluminium (TEAL), dialkyl aluminium chloride or alkyl aluminium dichloride or mixtures thereof. In one specific embodiment the cocatalyst (Co) is triethylaluminium (TEAL). Advantageously, the triethyl aluminium (TEAL) has a hydride content, expressed as $AlH_3$, of less than 1.0 wt % with respect to the triethyl aluminium (TEAL). More preferably, the hydride content is less than 0.5 wt %, and most preferably the hydride content is less than 0.1 wt %.

Preferably the ratio between the cocatalyst (Co) and the external donor (ED) [Co/ED] and/or the ratio between the cocatalyst (Co) and the transition metal (TM) [Co/TM] should be carefully chosen.

Accordingly, (a) the mol-ratio of cocatalyst (Co) to external donor (ED) [Co/ED] must be in the range of 5 to 45, preferably is in the range of 5 to 35, more preferably is in the range of 5 to 25; and optionally
(b) the mol-ratio of cocatalyst (Co) to titanium compound (TC) [Co/TC] must be in the range of above 80 to 500, preferably is in the range of 100 to 450, still more preferably is in the range of 120 to 350.

The heterophasic propylene copolymer (HECO1) is preferably prepared in the presence of (a) a Ziegler-Natta catalyst comprising compounds (TC) of a transition metal of Group 4 to 6 of IUPAC, a Group 2 metal compound and an internal donor, wherein said internal donor is a non-phthalic compound, preferably is a non-phthalic acid ester and still more preferably is a diester of non-phthalic dicarboxylic acids;
(b) a cocatalyst (Co), and
(c) optionally an external donor (ED).

The Inorganic Filler (F)

A further requirement of the polypropylene composition (C) according to this invention is the presence of an inorganic filler (F). The inorganic filler (F) is not regarded as being encompassed by the additives (AD) defined in more detail below.

It is appreciated that the inorganic filler (F) is a mineral filler. Preferably, the inorganic filler (F) is a mineral filler selected from the group consisting of talc, wollastonite, caolin and mica. In particular, it is preferred that the inorganic filler (F) is talc.

It is appreciated that the inorganic filler (F) has median particle size ($D_{50}$) in the range of 0.5 to 20.0 m and a top cut particle size ($D_{95}$) in the range of 2.0 to 20.0 m, preferably a median particle size ($D_{50}$) in the range of 1.0 to 8.0 µm and top cut particle size ($D_{95}$) in the range of 3.0 to 10.0 µm, more preferably a median particle size ($D_{50}$) in the range of 1.2 to 5.0 µm and top cut particle size ($D_{95}$) Of 4.0 to 8.5 µm.

According to this invention the inorganic filler (F) does not belong to the class of nucleating agents (NU) and additives (AD). The the inorganic filler (F) is state of the art and a commercially available product.

Nucleating Agent (NU)

The polypropylene composition (C) may comprise a nucleating agent (NU), such as an α-nucleating agent. Preferably, the polypropylene composition (C) comprises an α-nucleating agent and is free of β-nucleating agents.

The nucleating agent (NU) is preferably selected from the group consisting of (i) salts of monocarboxylic acids and polycarboxylic acids, e.g. sodium benzoate or aluminum tert-butylbenzoate;
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]nonitol;
(iii) salts of diesters of phosphoric acid, e.g. sodium 2,2'-methylenebis (4,6-di-tert-butylphenyl) phosphate or aluminium-hydroxy-bis[2,2'-methylene-bis(4,6-di-t-butylphenyl)phosphate], and
(iv) vinylcycloalkane polymer or vinylalkane polymer; and
(v) mixtures thereof.

Preferably the nucleating agent (NU) comprised in the polypropylene composition (C) is vinylcycloalkane polymer and/or vinylalkane polymer, more preferably vinylcycloalkane polymer, like vinylcyclohexane (VCH) polymer. Vinyl cyclohexane (VCH) polymer is particularly preferred as α-nucleating agent. It is appreciated that the amount of vinylcycloalkane, like vinylcyclohexane (VCH), polymer and/or vinylalkane polymer, more preferably of vinylcyclohexane (VCH) polymer, in the composition is not more than 500 ppm, preferably not more than 200 ppm, more preferably not more than 100 ppm, like in an amount in the range of 0.1 to 500 ppm, preferably in an amount in the range of 0.5 to 200 ppm, more preferably in an amount in the range of 1 to 100 ppm.

Furthermore, it is appreciated that the vinylcycloalkane polymer and/or vinylalkane polymer is introduced into the composition by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is preferably used for the preparation of the heterophasic propylene copolymer (HECO1) and/or the heterophasic propylene copolymer (HECO2) present in the polypropylene composition (C). The polymerized vinyl compound acts as an α-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

Additives (AD)

In addition, the polypropylene composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like.

Such additives are commercially available and for example described in "Plastic Additives Handbook", $6^{th}$ edition 2009 of Hans Zweifel (pages 1141 to 1190).

The term "additives (AD)" according to the present invention also includes polymeric carrier materials (PCM). However, the inorganic filler (F) and the nucleating agent (NU) are not regarded as additives (AD).

Polymeric Carrier Material (PCM)

As indicated above, it is appreciated that the polypropylene composition (C) does not comprise further polymer(s) different to the heterophasic propylene copolymer (HECO1) and the heterophasic propylene copolymer (HECO2) in an amount exceeding 10 wt.-%, preferably in an amount exceeding 5 wt.-%, more preferably in an amount exceeding 3 wt.-%, even more preferably in an amount exceeding 1 wt. %, based on the weight of the polypropylene composition (C).

If an additional polymer is present, such a polymer is typically a by-product of the polymerization process for preparing the heterophasic propylene copolymer (HECO1) and/or the heterophasic propylene copolymer (HECO2) or a polymeric carrier material (PCM).

A polymeric carrier material (PCM) is a carrier polymer to ensure a uniform distribution in the polypropylene composition (C). The polymeric carrier material (PCM) is not limited to a particular polymer. The polymeric carrier material may be an ethylene homopolymer, an ethylene copolymer obtained from ethylene and α-olefin comonomer such as $C_3$ to $C_8$ α-olefin comonomer, a propylene homopolymer and/or a propylene copolymer obtained from propylene and α-olefin comonomer such as ethylene and/or $C_4$ to $C_8$ α-olefin comonomer. If a polymeric carrier material is present it is typically a polymeric carrier material for inorganic filler (F), nucleating agent (NU) and/or additives (AD).

Article

The polypropylene composition (C) or the heterophasic propylene copolymer (HECO2) as such, can be used for the production of articles, preferably for the production of molded articles, more preferably for the production of injection molded articles. In particular, the polypropylene composition (C) or the heterophasic propylene copolymer (HECO2) as such, can be used for the production of automotive articles, preferably automotive articles selected from car interiors and exteriors, like bumpers, side trims, step assists, body panels, spoilers, dashboards, interior trims and the like.

Thus, the present invention is also directed at articles, preferably molded articles, more preferably injection molded articles such as automotive articles, in particular automotive articles selected from car interiors and exteriors, like bumpers, side trims, step assists, body panels, spoilers, dashboards, interior trims and the like, comprising the polypropylene composition (C) or the heterophasic propylene copolymer (HECO2).

It is appreciated that the articles, preferably the molded articles, more preferably the injection molded articles, such as automotive articles, in particular automotive articles selected from car interiors and exteriors, like bumpers, side trims, step assists, body panels, spoilers, dashboards, interior trims and the like, comprise the polypropylene composition (C) or the heterophasic propylene copolymer (HECO2) in an amount of at least at least 60 wt.-%, preferably in an amount of at least 80 wt.-%, more preferably in an amount of at least 95 wt.-%, based on the weight of the article.

In one embodiment the present invention is directed at injection moulded automotive articles selected from the group consisting of bumpers, side trims, step assists, body panels, spoilers, dashboards and interior trims comprising the polypropylene composition (C) or the heterophasic propylene copolymer (HECO2) in an amount at least 60 wt.-%, preferably in an amount of at least 80 wt.-%, more preferably in an amount of at least 95 wt.-%, based on the weight of the article.

In one embodiment the present invention is directed at injection moulded automotive articles selected from the group consisting of bumpers, side trims, step assists, body panels, spoilers, dashboards and interior trims consisting of the polypropylene composition (C) or the heterophasic propylene copolymer (HECO2).

With regard to the definition of the polypropylene composition (C) and the heterophasic propylene copolymer (HECO2) reference is made to the statements above when discussing the technical details of the compounds in question.

Use

The present invention is also directed at the use of the polypropylene composition (C) or the heterophasic propylene copolymer (HECO2) as such, to improve the paint adhesion on the surface of articles, preferably molded articles, more preferably injection molded articles such as automotive articles, in particular automotive articles selected from car interiors and exteriors, like bumpers, side trims, step assists, body panels, spoilers, dashboards, interior trims and the like.

In particular, the present invention is also directed at the use of the polypropylene composition (C) or the heterophasic propylene copolymer (HECO2) as such, to achieve on the surface of articles, preferably molded articles, more preferably injection molded articles such as automotive articles, in particular automotive articles selected from car interiors and exteriors, like bumpers, side trims, step assists, body panels, spoilers, dashboards, interior trims and the like, MSE values of equal or below 30, preferably of equal or below 10, like in the range of 1 to 30, preferably in the range of 1 to 15, more preferably in the range of 1 to 5.

With regard to the definition of the polypropylene composition (C) and the heterophasic propylene copolymer (HECO2) reference is made to the statements above when discussing the technical details of the compounds in question.

The present invention will now be described in further detail by the examples provided below.

EXAMPLES

A. Measuring Methods

The following definitions of terms and determination methods apply for the above general description of the invention as well as to the below examples unless otherwise defined.

Copolymer Microstructure and Comonomer Content is determined by quantitative nuclear-magnetic resonance (NMR) spectroscopy. Quantitative $^{13}C$ $\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}C$ $\{H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C$ $\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

Calculation of comonomer content of the elastomeric propylene copolymer rubber (EPR1):

$$\frac{Cx(HECO1) - w(PM1) \times Cx(PM1)}{w(EPR1)} = Cx(EPR1) \quad (III)$$

wherein w (PM1) is the weight fraction [in wt.-%] of the (semi)crystalline polypropylene matrix (PM1), i.e. the polymer produced in the loop reactor and the first gas phase reactor (LR+GPR1), w (EPR1) is the weight fraction [in wt.-%] of elastomeric propylene copolymer rubber (EPR1), i.e. the polymer produced in the second gas phase reactor (GPR2), $C_x$ (HECO1) is the comonomer content [in mol %] of the heterophasic propylene copolymer (HECO1), i.e. the polymer produced in the loop reactor, the first gas phase reactor and the second gas phase reactor (LR+GPR1+GPR2), $C_x$ (PM1) is the comonomer content [in mol %] of the (semi)crystalline polypropylene matrix (PM1), i.e. polymer produced in the loop reactor and the first gas phase reactor (LR+GPR1), $C_x$ (EPR1) is the calculated comonomer content [in mol %] of the second propylene copolymer fraction.

Calculation of comonomer content of the elastomeric propylene copolymer rubber (EPR2):

$$\frac{Cx(HECO2) - w(PM2) \times Cx(PM2)}{w(EPR2)} = Cx(EPR2) \quad (IV)$$

wherein w (PM2) is the weight fraction [in wt.-%] of the (semi)crystalline polypropylene matrix (PM2), i.e. the polymer produced in the loop reactor (LR), w (EPR2) is the weight fraction [in wt.-%] of elastomeric propylene copolymer rubber (EPR2), i.e. the polymer produced in the gas phase reactor (GPR), $C_x$ (HECO2) is the comonomer content [in mol %] of the heterophasic propylene copolymer (HECO2), i.e. the polymer produced in the loop reactor and the gas phase reactor (LR+GPR), $C_x$ (PM2) is the comonomer content [in mol %] of the (semi)crystalline polypropylene matrix (PM2), i.e. polymer produced in the loop reactor (LR), $C_x$ (EPR1) is the calculated comonomer content [in mol %] of the second propylene copolymer fraction.

$MFR_2$ (230° C.) is measured according to ISO 1133 (230° C., 2.16 kg load).

Intrinsic Viscosity is measured according to DIN ISO 1628/1, October 1999 in decalin at 135° C.

Xylene Cold Soluble (XCS) fraction is determined at 25° C. according ISO 16152; first edition; 2005-07-01. The part which remains insoluble is the xylene cold insoluble (XCI) fraction.

Cutoff Particle Size $D_{95}$ (Sedimentation) is calculated from the particle size distribution [mass percent] as determined by gravitational liquid sedimentation according to ISO 13317-3 (Sedigraph).

Median Particle Size $D_{50}$ (Sedimentation) is calculated from the particle size distribution [mass percent] as determined by gravitational liquid sedimentation according to ISO 13317-3 (Sedigraph).

Flexural Modulus was measured according to ISO 178 using injection molded test specimen as described in EN ISO 1873-2 with dimensions of 80×10×4 mm³. Crosshead speed was 2 mm/min for determining the flexural modulus.

Charpy Notched Impact Strength (CNIS) is measured according to ISO 179-1/leA/DIN 53453 at 23° C., −20° C. and −30° C., using injection molded bar test specimens of 80×10×4 mm³ prepared in accordance with ISO 294-1:1996.

Adhesion is characterized as the resistance of the prefabricated scratch template to pressure-water jetting according to DIN 55662 (Method C).

Injection moulded sample plates (150 mm×80 mm×2 mm) were cleaned with a mixture of isopropanol and water (1:1). Subsequently the surface was activated via flaming where a burner with a speed of 600 mm/s spreads a mixture of propane and air in a ratio of 1:23 with a flow rate of 150 l/h on the polymer substrate. Afterwards, the polymer substrate was coated with 2 layers of black paint, i.e. a base coat (Black BMW 668) and a clear coat (BMW 68895). The step of flaming was performed two times.

A steam of hot water with temperature T was directed for time t at distance d under angle α to the surface of the test panel. Pressure of the water jet results from the water flow rate and is determined by the type of nozzle installed at the end of the water pipe.

The following parameters were used:

T (water)=60° C.; t=60 s; d=130 mm, α=90°, water flow rate 11.3 l/min, nozzle type=MPEG 2506.

The adhesion was assessed by quantifying the failed or delaminated painted area per test line. For each example 5 panels (150 mm×80 mm×2 mm) have been tested. The panels were produced by injection moulding with 240° C. melt temperature and 50° C. mold temperature. The flow front velocity was 100 mm/s. On each panel certain lines were used to assess the paintability failure in [mm²]. For this purpose, an image of the test point before and after steam jet exposure was taken. Then the delaminated area was calculated with an image processing software. The average failed area for 5 test lines on 5 test specimens (i.e. in total the average of 25 test points) was reported as average failed area.

2. Examples

The polypropylene composition (C) of the inventive example (IE1) is prepared from melt blending heterophasic propylene copolymer (HECO1), heterophasic propylene copolymer (HECO2), filler (F) and additives (AD).

Preparation of HECO1:

Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold TiCl were added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. over a period of 90 minutes and subsequently the slurry was allowed to stand for 60 minutes. Then, another 300 ml of TiCl were added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491566, EP 591224 and EP 586390.

The catalyst was further modified (VCH modification of the catalyst). 52 ml of mineral oil (Paraffinum Liquidum PL68) was added to a 125 ml stainless steel reactor followed by 1.17 g of triethyl aluminium (TEAL) and 0.73 g of dicyclopentyl dimethoxy silane (D-donor) under inert conditions at room temperature. After 10 minutes, 5.0 g of the catalyst prepared above (Ti content 1.8 wt.-%) was added, and after additional 20 minutes 5.0 g of vinylcyclohexane (VCH) was added. The temperature was increased to 65° C. over a period of 30 minutes and was kept there for 20 hours. The respective processes are described in EP 1 028 984, EP 1 183 307 and EP 591 224.

Polymerization

The preparation of the heterophasic propylene copolymer (HECO1) is summarized in Table 1a. The properties of the heterophasic propylene copolymer (HECO1) are summarized in Table 1b

TABLE 1a

Polymerization conditions of the heterophasic propylene copolymer (HECO1)

|  |  | HECO1 |
|---|---|---|
| Donor |  | DCPDMS |
| Cocatalyst |  | TEAL |
| Co/ED | [mol/mol] | 7.3 |
| Co/TC | [mol/mol] | 220 |
| Prepolymerization |  |  |
| Residence time | [h] | 0.08 |
| Temperature | [° C.] | 30 |
| Matrix (PM1) |  |  |
| Loop Reactor (LR) |  |  |
| Split | [wt.-%]# | 39 |
| TEMP | [° C.] | 72 |
| PRE | [kPa] | 5633 |
| RES | [h] | 0.6 |
| H2/C3 | [mol/kmol] | 14.8 |
| MFR | [g/10 min] | 55 |
| Matrix (PM1) |  |  |
| 1st Gas Phase Reactor (GPR1) |  |  |
| Split | [wt.-%]# | 26 |
| TEMP | [° C.] | 80 |

TABLE 1a-continued

Polymerization conditions of the heterophasic propylene copolymer (HECO1)

|  |  | HECO1 |
|---|---|---|
| PRE | [kPa] | 2231 |
| RES | [h] | 0.75 |
| H2/C3 | [mol/kmol] | 150 |
| MFR2 | [g/10 min] | 55 |
| Elastomer (EPR1) |  |  |
| 2nd Gas Phase Reactor (GPR2) |  |  |
| Split | [wt.-%]# | 20 |
| TEMP | [° C.] | 70 |
| PRE | [kPa] | 2291 |
| RES | [h] | 0.6 |
| H2/C2 ratio | [mol/kmol] | 116 |
| C2/C3 ratio | [mol/kmol] | 584 |
| C2 | [mol %] | 12.2 |
| MFR | [g/10 min] | 20 |
| XCS | wt % | 20 |
| Elastomer (EPR1) |  |  |
| 3rd Gas Phase Reactor (GPR3) |  |  |
| Split | [wt.-%]# | 15 |
| Residence time | [h] | 0.6 |
| Temperature | [° C.] | 85 |
| Pressure | [kPa] | 1421 |
| C2/C3 ratio | [mol/kmol] | 585.2 |
| H2/C2 ratio | [mol/kmol] | 92.7 |
| MFR | [g/10 min] | 11 |
| split | [wt %]# | 15 | wt.-% Based on the weight of the heterophasic propylene copolymer (HECO1)
DCPDMS Dicyclopentyl dimethoxy silane
TEAL Triethylaluminium
Co/ED Molar ratio of cocatalyst to external donor in the catalyst
Co/TC Molar ratio of cocatalyst to titanium compound
MFR Melt flow rate at 230° C.
TEMP Temperature
PRES Pressure
RES Residence time
H2/C3 Molar ratio of hydrogen to propylene
C2/C3 Molar ratio of ethylene to propylene
H2/C2 Molar ratio of hydrogen to ethylene

TABLE 1b

Properties of the heterophasic propylene copolymer (HECO1)

| Example |  | HECO1 |
|---|---|---|
| XCS | [wt.-%]# | 32 |
| IV (XCS) | [dl/g] | 3.1 |
| C2 (XCS) | [mol %] | 48 |
| MFR2 | [g/10 min] | 11 |
| C2 | [mol %] | 18.5 |
| FM | [MPa] | 1050 |
| CNIS (20) | [kJ/m2] | 8.5 | wt.-% Based on the weight of the heterophasic propylene copolymer (HECO1)
XCS Xylene cold soluble fraction
IV (XCS) Intrinsic viscosity of the xylene cold soluble fraction
C2 (XCS) Ethylene content of the xylene cold soluble fraction
MFR2 Melt flow rate at 230° C.
C2 Ethylene content
FM Felxural modulus
CNIS (20) Charpy notched impact strength at −20° C.

The propylene copolymer (HECO1) was blended with the 0.05 wt.-% calcium stearate and 0.20 wt.-% Irganox B225FF, based on the weight of the heterophasic propylene copolymer (HECO1), using a twin-screw extruder TSE16TC of Thermo Electron Company GmbH. The calcium stearate and Irganox B225FF are standard antioxidants agents used for stabilizing polymer powders.

Preparation of HECO2:

The HECO2 was prepared in a 21.3 l autoclave equipped with control valves for dosing the reactor with monomers, hydrogen and for flashing. The dosage of monomers and hydrogen into the reactor was monitored by flow controllers and also by monitoring the mass of their respective reservoirs. The temperature of the reactors was controlled via cooling/heating of water in the double jacket around the reactors including sensors in both the top and bottom of the reactor. Helical stirrers with magnetic coupling were used for effective mixing inside the reactor and the stirring rates could be varied during the course of the reaction.

Catalyst Preparation

Used chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow Bis(2-ethylhexyl)citraconate, provided by SynphaBase $TiCl_4$, provided by Millenium Chemicals Toluene, provided by Aspokem Viscoplex® 1-254, provided by Evonik Heptane, provided by Chevron Preparation of a Mg Alkoxy Compound:

Mg alkoxide solution was prepared by adding, with stirring at 70 rpm, into 11 kg of a 20 wt.-% solution of butyl ethyl magnesium (Mg(Bu)(Et)) in toluene, a mixture of 4.7 kg of 2-ethylhexanol and 1.2 kg of butoxypropanol in a 20 l stainless steel reactor. During the addition the reactor contents were maintained below 45° C. After the addition was completed, stirring at 70 rpm of the reaction mixture was continued at 60° C. for 30 minutes. After cooling to room temperature 2.3 kg g of the donor bis(2-ethylhexyl)citraconate was added to the Mg-alkoxide solution keeping temperature below 25° C.

Mixing was continued for 15 minutes under stirring at 70 rpm.

Preparation of Solid Catalyst Component:

20.3 kg of $TiCl_4$ and 1.1 kg of toluene were added into a 20 l stainless steel reactor. Under stirring at 350 rpm and keeping the temperature at 0° C., 14.5 kg of the above Mg alkoxy compound was added over a period of 1.5 hours. 1.7 l of Viscoplex® 1-254 and 7.5 kg of heptane were added and after 1 hour mixing at 0° C., the temperature of the formed emulsion was raised to 90° C. over a period of 1 hour. After 30 minutes mixing was stopped catalyst droplets were solidified and the formed catalyst particles were allowed to settle. After settling for 1 hour, the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

Polymerization

Prepolymerization:

The reactor is initially purged with propylene and then filled with 5930 g of propylene and 3 litres of hydrogen for the prepolymerization. The catalyst as defined above (a suspension in a mineral oil) was mixed with a solution of TEAl and D-donor at a TEAl/Ti ratio of 250 mol/mol and a TEAl/Donor ratio of 10 mol/mol for 5 minutes before being added to the reactor. The catalyst loading vessel is then flushed with 250 g propylene to ensure all of the catalyst mixture is added to the reactor. The reactor then undergoes prepolymerization at 30° C. for 6 minutes while stirring at 350 rpm.

Matrix (PM2) Bulk Slurry Reactor (SR):

Subsequently, the reactor is heated up to 80° C. to initiate bulk conditions. While in transition, the desired amount of hydrogen is added to the reactor via a flow controller. Hydrogen is always added batchwise and not continuously during the reaction. Once the desired reactor conditions are reached, the reactor is held at a constant pressure by dosing with propylene. This transition time to reach the bulk conditions was 18 minutes. After the specified bulk residence time, the reactor is purged to 1.5 bar with a stirring speed of 100 rpm. Residual gases are removed from the reactor by treating the reactor with several nitrogen/vacuum cycles to continue to elastomer gas phase step.

Elastomer (EPR2) GPR:

Once the desired purge pressure of 1.5 bar was achieved, the transition to the elastomer gas phase reactor (GPR) began. The stirring rate of the reactor was increased to 200 rpm and the reactor was dosed with propylene and ethylene as the temperature and pressure were increased to the desired levels. The transition time between bulk conditions (SR) and the elastomer gas phase reactor (GPR) was 5 minutes. The comonomers were added to maintain a desired gas ratio. Once the reactor reached the desired temperature, the pressure was held constant at the desired level by dosing with ethylene and propylene at the appropriate gas ratio. The amount of polymer being produced could be monitored by measuring the amount of propylene and ethylene added during the course of the reaction. After a desired split level was reached, the reactor followed the termination procedure outlined below.

Reaction Termination:

After the reaction is completed the stirring speed is reduced to 100 rpm and the gas mixture purged from the reactor to 0 barg. Residual gases are removed from the reactor by treating the reactor with several nitrogen/vacuum cycles. This cycle involves putting the reactor under vacuum for several minutes, filling up to ambient pressures with nitrogen and then repeating the process several times. The product is then safely removed from the reactor.

The preparation of the heterophasic propylene copolymer (HECO2) is summarized in Table 2a. The properties of the heterophasic propylene copolymer (HECO2) are summarized in Table 2b TABLE 2a Polymerization conditions of the heterophasic propylene copolymer (HECO2)

| | | HECO2 |
|---|---|---|
| Donor | | DCPDMS |
| Cocatalyst | | TEAL |
| Co/ED | [mol/mol] | 10 |
| Co/TC | [mol/mol] | 250 |
| Matrix (PM2) | | |
| Bulk Slurry Reactor (SR) | | |
| Split | [wt.-%]# | 45 |
| TEMP | [° C.] | 80 |
| PRE | [kPa] | 5682 |
| RES | [h] | 1.0 |
| H2/C3 | [mol/kmol] | 39.7 |
| MFR | [g/10 min] | 550 |
| $XCS_m$ | [wt.-%]## | 2.5 |
| Elastomer (EPR2) | | |
| Gas Phase Reactor (GPR) | | |
| Split | [wt.-%]# | 55 |
| TEMP | [° C.] | 80 |
| PRE | [kPa] | 1300 |

TABLE 2a-continued

Polymerization conditions of the heterophasic propylene copolymer (HECO2)

|  |  | HECO2 |
|---|---|---|
| RES | [h] | 3.0 |
| C2/C3 | [mol/kmol] | 2036 |
| H2/C2 | [mol/mol] | 0 | wt.-% Based on the weight of the heterophasic propylene copolymer (HECO2)
wt.-% Based on the weight of the (semi)crystalline polypropylene matrix (PM1)
DCPDMS Dicyclopentyl dimethoxy silane
TEAL Triethylaluminium
Co/ED Molar ratio of cocatalyst to external donor in the catalyst
Co/TC Molar ratio of cocatalyst to titanium compound in the catalyst
MFR Melt flow rate at 230° C.
$XCS_m$ Xylene cold soluble fraction of the matrix
TEMP Temperature
PRES Pressure
RES Residence time
C2/C3 Molar ratio of ethylene to propylene
H2/C3 Molar ratio of hydrogen to propylene
H2/C2 Molar ratio hydrogen to ethylene

TABLE 2b

Properties of the heterophasic propylene copolymer (HECO2)

| Example |  | HECO2 |
|---|---|---|
| XCS | [wt.-%]# | 29.2 |
| IV (XCS) | [dl/g] | 9.9 |
| C2 (XCS) | [mol %] | 67 |
| MFR | [g/10 min] | 0.47 |
| C2 | [wt.-%]# | 33.7 | wt.-% Based on the weight of heterophasic propylene copolymer (HECO2)
XCS Xylene cold soluble fraction
IV (XCS) Intrinsic viscosity of the xylene cold soluble fraction
IV (XCI) Intrinsic viscosity of the xylene cold insoluble fraction
C2 (XCS) Ethylene content of the xylene cold soluble fraction
MFR Melt flow rate at 230° C.
C2 Ethylene content The polypropylene compositions were prepared by melt blending using a twin-screw extruder TSE16TC. During the compounding the following temperature profile was set: 190, 210, 230, 210° C.

The components and the amounts applied in the preparation of the polypropylene compositions are summarized in Table 3.

TABLE 3

Preparation of the Polypropylene Compositions (C) of the Examples

|  |  | IE1 | IE2 | CE1 | CE2 |
|---|---|---|---|---|---|
| HECO1 | [wt.-%]# | 70 | 70 | 70 | 70 |
| HECO2 | [wt.-%]# | 15 |  |  |  |
| HECO2 (m) | [wt.-%]# |  | 15 |  |  |
| HECO3 | [wt.-%]# |  |  | 15 |  |
| HECO3 (m) | [wt.-%]# |  |  |  | 15 |
| Filler (F) | [wt.-%]# | 15 | 15 | 15 | 15 |
| Additive (AD) | [wt.-%]## | 0.25 | 0.25 | 0.25 | 0.25 | wt.-% Based on the weight of the propylene compositions (C)
wt.-% Based on the weight of the heterophasic propylene copolymer (HECO1)
HECO2 (m) Heterophasic propylene copolymer described according to Table 2a and Table 2b, which has been modified with 5 wt.-% based on the weight of the heterophasic propylene copolymer (HECO2), of a master batch comprising polypropylene and 1 wt.-% of 2,5-dimethyl-2,5-di-(tert-butylperoxy)hexane (DHBP) based on the weight of the masterbatch. HECO2 (m) has a melt flow rate MFR$_2$ (230° C.) of 5 g/10 min. The properties of HECO2(m) are described in Table 4.
HECO3 Commercial heterophasic propylene copolymer ED007HP of Borealis having a melt flow rate MFR$_2$ (230° C.) of 7 g/10 min.

TABLE 3-continued

Preparation of the Polypropylene Compositions (C) of the Examples

|  | IE1 | IE2 | CE1 | CE2 |
|---|---|---|---|---|

HECO3 (m) Commercial heterophasic propylene copolymer ED007HP of Borealis, which has been modified with 0.5 wt.-%, based on the weight of the heterophasic propylene copolymer (HECO3), of a master batch comprising polypropylene and 1 wt.-% (2,5-dimethyl-2,5-di-(tert-butylperoxy)hexane (DHBP), based on the weight of the masterbatch. HECO3 (m) has a melt flow rate MFR$_2$ (230° C.) of 10 g/10 min. The properties of HECO3(m) are described in Table 5
Filler (F) Commercial Talc Steamic T1 CA by Luzenac having a D$_{50}$ (Sedigraph 5100) of 1.81 μm and D$_{95}$ (Sedigraph 5100) of 6.2 μm.
Additives (AD) Penthaerythtrityl-tetrakis(3-(3',5'-di-tert. Butyl-4-hydroxyphenyl)-propionate (Irganox B225FF) 0.20 wt. % and Calciumstearate by Faci, 0.05 wt.-%.

TABLE 4

Properties of the modified heterophasic propylene copolymer (HECO2(m))

| Example |  | HECO2m |
|---|---|---|
| XCS | [wt.-%]# | 35.6 |
| IV (XCS) | [dl/g] | 4.35 |
| C2 (XCS) | [mol %] | 73 |
| MFR | [g/10 min] | 5.0 |
| C2 | [wt.-%]# | 33 |
| FM | [MPa] | 500 |
| CNIS (23) | [kJ/m$^2$] | 15.5 | wt.-% Based on the weight of heterophasic propylene copolymer (HECO2)
XCS Xylene cold soluble fraction
IV (XCS) Intrinsic viscosity of the xylene cold soluble fraction
IV (XCI) Intrinsic viscosity of the xylene cold insoluble fraction
C2 (XCS) Ethylene content of the xylene cold soluble fraction
MFR Melt flow rate at 230° C.
C2 Ethylene content
FM Felxural modulus
CNIS (23) Charpy notched impact strength at +23° C.
CNIS (20) Charpy notched impact strength at −20° C.

TABLE 5

Properties of the modified heterophasic propylene copolymer (HECO3(m))

| Example |  | HECO3m |
|---|---|---|
| XCS | [wt.-%]# | 23 |
| IV (XCS) | [dl/g] | 4.7 |
| C2 (XCS) | [mol %] | 36.2 |
| MFR | [g/10 min] | 10.0 |
| C2 | [wt.-%]# | 17.8 |
| FM | [MPa] | 1059 |
| CNIS (23) | [kJ/m$^2$] | 55 |
| CNIS (20) | [kJ/m$^2$] | 7.9 | wt.-% ased on the weight of heterophasic propylene copolymer (HECO2)
XCS Xylene cold soluble fraction
IV (XCS) Intrinsic viscosity of the xylene cold soluble fraction
IV (XCI) Intrinsic viscosity of the xylene cold insoluble fraction
C2 (XCS) Ethylene content of the xylene cold soluble fraction
MFR Melt flow rate at 230° C.
C2 Ethylene content
FM Felxural modulus
CNIS (23) Charpy notched impact strength at +23° C.
CNIS (20) Charpy notched impact strength at −20° C.

TABLE 5

Properties of the Examples

|  |  | IE1 | IE2 | CE3 | CE4 |
|---|---|---|---|---|---|
| MFR$_2$ | [g/10 min] | 7 | 5 | 10 | 10 |
| C2 | [mol %] | 24.1 | 23.4 | 17.9 | 17.8 |
| XCS | [wt.-%]# | 26 | 27.7 | 25 | 25 |
| C2(XCS) | [mol %] | 54.7 | 54.3 | 48.5 | 47.9 |
| IV(XCS) | [dl/g] | 4.2 | 3.3 | 3.6 | 3.4 |
| FM | [MPa] | 1549 | 1557 | 1728 | 1711 |

TABLE 5-continued

Properties of the Examples

|  |  | IE1 | IE2 | CE3 | CE4 |
|---|---|---|---|---|---|
| CNIS(23) | [kJ/m$^2$] | 57 | 48 | 41 | 42 |
| CNIS(20) | [kJ/m$^2$] | 10 | 9 | 6.5 | 6.7 |
| PFA (1:23) | mm$^2$ | 0 | 0 | 0.3 ± 1 | 0.7 ± 3 |
| L1FA | mm | 0 ± 0 | 0 ± 0 | 0 ± 0 | 2.2 ± 5 |
| L2FA | mm | 0 ± 0 | 0 ± 0 | 0.8 ± 2 | 0 ± 0 |
| L3FA | mm | 0 ± 0 | 0 ± 0 | 0 ± 0 | 0 ± 0 | wt.-% Based on the weight of polypropylene composition (C)
MFR Melt flow rate at 230° C.
C2 Ethylene content
XCS Xylene cold soluble fraction
C2 (XCS) Ethylene content of the xylene cold soluble fraction
IV (XCS) Intrinsic viscosity of the xylene cold soluble fraction
FM Felxural modulus
CNIS(23) Charpy notched impact strength at +23° C.
CNIS(20) Charpy notched impact strength at −20° C.
PFA Painted Failed Area
L1FA Line 1 failed area
L2FA Line 2 failed area
L3FA Line 3 failed area

The invention claimed is:

1. Polypropylene composition (C) comprising:
   (i) 62 to 85 wt. %, based on the total weight of the polypropylene composition (C), of a heterophasic propylene copolymer (HECO1) with a melt flow rate MFR$_2$ measured according to ISO 1133 at 230° C., 2.16 kg load in the range of 6.0 to 50.0 g/10 min;
   (ii) 10 to 30 wt. %, based on the total weight of the polypropylene composition (C), of a heterophasic propylene copolymer (HECO2) with a melt flow rate MFR$_2$ measured according to ISO 1133 at 230° C., 2.16 kg load in the range of 0.1 to 5.5 g/10 min;
   (iii) 5 to 30 wt. %, based on the total weight of the polypropylene composition (C), of an inorganic filler (F);
   wherein
   (a) the xylene cold soluble (XCS) fraction of the heterophasic propylene copolymer (HECO1) has a lower amount [in mol %] of C$_2$ and/or C$_4$ to C$_{12}$ α-olefin derived comonomer units than the xylene cold soluble (XCS) fraction of the heterophasic propylene copolymer (HECO2);
   (b) the xylene cold soluble (XCS) fraction of the heterophasic propylene copolymer (HECO1) has a lower the intrinsic viscosity (IV) than the xylene cold soluble (XCS) fraction of the heterophasic propylene copolymer (HECO2); and
   (c) the xylene cold soluble (XCS) fraction of the heterophasic propylene copolymer (HECO2) has an intrinsic viscosity (IV) in the range of 6.0 to 15.0 dl/g, and wherein
   (d) the xylene cold soluble (XCS) fraction of the heterophasic propylene copolymer (HECO2) comprises comonomer units derived from C2 and/or C4 to C12 α-olefin in an amount in the range of 62 to 85 mol %.

2. Polypropylene composition (C) according to claim 1, wherein the xylene cold soluble (XCS) fraction of the heterophasic propylene copolymer (HECO1) comprises comonomer units derived from C$_2$ and/or C$_4$ to C$_{12}$ α-olefin in an amount in the range of 35 to 60 mol %.

3. Polypropylene composition (C) according to claim 1, wherein the xylene cold soluble (XCS) fraction of the heterophasic propylene copolymer (HECO1) has an intrinsic viscosity (IV) in the range of 0.8 to 5.5 dl/g.

4. Polypropylene composition (C) according to claim 1, wherein:
   (i) the heterophasic propylene copolymer (HECO1) comprises a (semi)crystalline polypropylene matrix (PM1) and an elastomeric propylene copolymer rubber (EPR1) dispersed in said (semi)crystalline polypropylene matrix (PM1); and
   (ii) the heterophasic propylene copolymer (HECO2) comprises a (semi)crystalline polypropylene matrix (PM2) and an elastomeric propylene copolymer rubber (EPR2) dispersed in said (semi)crystalline polypropylene matrix (PM2).

5. Polypropylene composition (C) according to claim 1, wherein the heterophasic propylene copolymer (HECO1) and the heterophasic propylene copolymer (HECO2) are not modified by treatment with a peroxide (PO).

6. Polypropylene composition (C) according to claim 1, wherein the inorganic filler (F) is a mineral filler.

7. Polypropylene composition (C) according to claim 6, wherein the inorganic filler (F) is talc with an average particle size (D$_{50}$) in the range of 0.5 to 20.0 calculated from the particle size distribution [mass percent] as determined by gravitational liquid sedimentation according to ISO 13317-3 (Sedigraph).

8. Heterophasic propylene copolymer (HECO2), wherein:
   (i) the xylene cold soluble (XCS) fraction of the heterophasic propylene copolymer (HECO2) has an intrinsic viscosity (IV) of in the range of 6.0 to 15.0 dl/g;
   (ii) the xylene cold soluble (XCS) fraction of the heterophasic propylene copolymer (HECO2) comprises comonomer units derived from C$_2$ and/or C$_4$ to C$_{12}$ α-olefin in an amount in the range of 62 to 85 mol %; and
   (iii) a melt flow rate MFR$_2$ measured according to ISO 1133 at 230° C., 2.16 kg load of the heterophasic propylene copolymer (HECO2) is in the range of 0.1 to 5.5 g/10 min.

9. Moulded article comprising the polypropylene composition (C) according to claim 1.

10. Moulded article according to claim 9, wherein the article is an automotive article.

11. Moulded article of claim 9, wherein the polypropylene composition (C) enhances paint adhesion of the moulded article.

* * * * *